(12) United States Patent
Fishman et al.

(10) Patent No.: US 11,593,444 B2
(45) Date of Patent: *Feb. 28, 2023

(54) COLLECTING DATA FROM DIFFERENT SOURCES

(71) Applicant: OpenTV, Inc., San Francisco, CA (US)

(72) Inventors: Alex Fishman, San Francisco, CA (US); Crx K. Chai, Oakland, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,692

(22) Filed: Jun. 24, 2021

(65) Prior Publication Data

US 2021/0382955 A1 Dec. 9, 2021

Related U.S. Application Data

(63) Continuation of application No. 16/237,022, filed on Dec. 31, 2018, now Pat. No. 11,074,308, which is a
(Continued)

(51) Int. Cl.
*H04N 21/262* (2011.01)
*H04N 21/442* (2011.01)
(Continued)

(52) U.S. Cl.
CPC ...... *G06F 16/9535* (2019.01); *G06F 16/4387* (2019.01); *G06Q 10/00* (2013.01);
(Continued)

(58) Field of Classification Search
CPC ....... H04N 21/26258; H04N 21/44204; H04N 21/4667; H04N 21/44008;
(Continued)

(56) References Cited

U.S. PATENT DOCUMENTS 4,718,107 A 1/1988 Hayes et al.
4,769,697 A 9/1988 Gilley et al.
(Continued)

FOREIGN PATENT DOCUMENTS

AU 201101152 10/2011
CA 2810521 5/2020
(Continued)

OTHER PUBLICATIONS

F. Alvarez et al., "Audience Measurement Modeling for Convergent Broadcasting and IPTV Networks," in IEEE Transactions on Broadcasting, vol. 55, No. 2, pp. 502-515, Jun. 2009, doi: 10.1109/TBC.2008.2012040. (Year: 2009).*
(Continued)

*Primary Examiner* — Cynthia M Fogg
(74) *Attorney, Agent, or Firm* — Schwegman Lundberg & Woessner, P.A.

(57) ABSTRACT

A system for collecting data from different sources is described. In one example embodiment, the system obtains content-related data from a plurality of source computer systems, automatically identifies, based on the content-related data, content items having respective popularity values greater than a predetermined threshold value as popular content items, and automatically generates a list of popular content items based on the popular content items.

20 Claims, 6 Drawing Sheets

Related U.S. Application Data continuation of application No. 12/878,001, filed on Sep. 8, 2010, now Pat. No. 10,210,160, which is a continuation-in-part of application No. 12/877,034, filed on Sep. 7, 2010, now Pat. No. 9,699,503.

(51) Int. Cl.

| | |
|---|---|
| *H04N 21/466* | (2011.01) |
| *G06F 16/9535* | (2019.01) |
| *G06Q 10/00* | (2012.01) |
| *G06Q 30/00* | (2012.01) |
| *G06Q 30/02* | (2012.01) |
| *G06F 16/438* | (2019.01) |
| H04H 60/33 | (2008.01) |
| H04H 60/65 | (2008.01) |

(52) U.S. Cl.
CPC ............ *G06Q 30/00* (2013.01); *G06Q 30/02* (2013.01); *H04N 21/26258* (2013.01); *H04N 21/44204* (2013.01); *H04N 21/4667* (2013.01); *H04H 60/33* (2013.01); *H04H 60/65* (2013.01)

(58) Field of Classification Search
CPC ........... H04N 21/23418; H04N 21/466; G06Q 30/02; G06Q 30/0201; G06Q 10/00; G06Q 30/00; H04L 67/22; G06F 16/9535; G06F 16/4387; H04H 60/33; H04H 60/65
USPC ......................................................... 725/58
See application file for complete search history.

(56) References Cited

U.S. PATENT DOCUMENTS

| | | |
|---|---|---|
| 4,907,079 A | 3/1990 | Turner et al. |
| 4,930,160 A | 5/1990 | Vogel |
| 4,931,865 A | 6/1990 | Scarampi |
| 5,019,899 A | 5/1991 | Boles et al. |
| 5,034,807 A | 7/1991 | Von Kohorn |
| 5,068,733 A | 11/1991 | Bennett |
| 5,099,322 A | 3/1992 | Gove |
| 5,227,874 A | 7/1993 | Von Kohorn |
| 5,264,933 A | 11/1993 | Rosser et al. |
| 5,283,639 A | 2/1994 | Esch et al. |
| 5,353,392 A | 10/1994 | Luquet et al. |
| 5,373,315 A | 12/1994 | Dufresne et al. |
| 5,382,983 A | 1/1995 | Kwoh et al. |
| 5,410,326 A | 4/1995 | Goldstein |
| 5,467,288 A | 11/1995 | Fasciano et al. |
| 5,483,276 A | 1/1996 | Brooks et al. |
| 5,497,185 A | 3/1996 | Dufresne et al. |
| 5,508,731 A | 4/1996 | Kohorn |
| 5,515,485 A | 5/1996 | Luquet et al. |
| 5,524,193 A | 6/1996 | Covington et al. |
| 5,543,856 A | 8/1996 | Rosser et al. |
| 5,546,471 A | 8/1996 | Merjanian |
| 5,579,002 A | 11/1996 | Igguiden et al. |
| 5,583,980 A | 12/1996 | Anderson |
| 5,590,262 A | 12/1996 | Isadore-Barreca |
| 5,600,368 A | 2/1997 | Matthews, III |
| 5,600,775 A | 2/1997 | King et al. |
| 5,603,078 A | 2/1997 | Henderson et al. |
| 5,604,896 A | 2/1997 | Duxbury et al. |
| 5,613,909 A | 3/1997 | Stelovsky |
| 5,614,940 A | 3/1997 | Cobbley et al. |
| 5,621,454 A | 4/1997 | Ellis et al. |
| 5,627,936 A | 5/1997 | Prasad et al. |
| 5,631,903 A | 5/1997 | Dianda et al. |
| 5,635,989 A | 6/1997 | Rothmuller |
| 5,652,615 A | 7/1997 | Bryant et al. |
| 5,655,144 A | 8/1997 | Milne et al. |
| 5,661,516 A | 8/1997 | Carles |
| 5,663,756 A | 9/1997 | Blahut et al. |
| 5,664,046 A | 9/1997 | Abecassis |
| 5,675,511 A | 10/1997 | Prasad et al. |
| 5,680,639 A | 10/1997 | Milne et al. |
| 5,708,845 A | 1/1998 | Wistendahl et al. |
| 5,715,014 A | 2/1998 | Perkins et al. |
| 5,724,472 A | 3/1998 | Abecassis |
| 5,727,141 A | 3/1998 | Hoddie et al. |
| 5,740,549 A | 4/1998 | Reilly et al. |
| 5,758,257 A | 5/1998 | Herz et al. |
| 5,758,259 A | 5/1998 | Lawler |
| 5,765,164 A | 6/1998 | Prasad et al. |
| 5,771,307 A | 6/1998 | Lu et al. |
| 5,774,664 A | 6/1998 | Hidary et al. |
| 5,774,666 A | 6/1998 | Portuesi |
| 5,793,409 A | 8/1998 | Tetsumura |
| 5,794,210 A | 8/1998 | Goldhaber et al. |
| 5,798,785 A | 8/1998 | Hendricks et al. |
| 5,801,747 A | 9/1998 | Bedard |
| 5,812,123 A | 9/1998 | Rowe et al. |
| 5,818,510 A | 10/1998 | Cobbley et al. |
| 5,828,402 A | 10/1998 | Collings |
| 5,848,396 A | 12/1998 | Gerace |
| 5,854,927 A | 12/1998 | Gelissen |
| 5,859,662 A | 1/1999 | Cragun et al. |
| 5,861,881 A | 1/1999 | Freeman et al. |
| 5,894,320 A | 4/1999 | Vancelette |
| 5,898,838 A | 4/1999 | Wagner |
| 5,917,830 A | 6/1999 | Chen et al. |
| 5,920,642 A | 7/1999 | Merjanian |
| 5,929,849 A | 7/1999 | Kikinis |
| 5,929,850 A | 7/1999 | Broadwin et al. |
| 5,931,908 A | 8/1999 | Gerba et al. |
| 5,945,988 A | 8/1999 | Williams et al. |
| 5,951,639 A | 9/1999 | MacInnis |
| 5,970,504 A | 10/1999 | Abe et al. |
| 5,973,683 A | 10/1999 | Cragun et al. |
| 5,977,962 A | 11/1999 | Chapman et al. |
| 5,978,013 A | 11/1999 | Jones et al. |
| 5,982,399 A | 11/1999 | Scully et al. |
| 5,987,509 A | 11/1999 | Portuesi |
| 5,990,911 A | 11/1999 | Arrott |
| 5,995,091 A | 11/1999 | Near et al. |
| 6,002,393 A | 12/1999 | Hite et al. |
| 6,002,443 A | 12/1999 | Igguiden |
| 6,006,241 A | 12/1999 | Purnaveja et al. |
| 6,006,256 A | 12/1999 | Zdepski et al. |
| 6,012,098 A | 1/2000 | Bayeh et al. |
| 6,020,882 A | 2/2000 | Kinghorn et al. |
| 6,021,275 A | 2/2000 | Horwat |
| 6,028,950 A | 2/2000 | Merjanian |
| 6,029,045 A | 2/2000 | Picco et al. |
| 6,038,367 A | 3/2000 | Abecassis |
| 6,049,821 A | 4/2000 | Theriault et al. |
| 6,057,833 A | 5/2000 | Heidmann et al. |
| 6,057,872 A | 5/2000 | Candelore |
| 6,058,430 A | 5/2000 | Kaplan |
| 6,061,056 A | 5/2000 | Menard et al. |
| 6,061,719 A | 5/2000 | Bendinelli et al. |
| 6,069,672 A | 5/2000 | Claassen |
| 6,075,526 A | 6/2000 | Rothmuller |
| 6,075,971 A | 6/2000 | Williams et al. |
| 6,078,322 A | 6/2000 | Simonoff et al. |
| 6,083,276 A | 7/2000 | Davidson et al. |
| 6,091,886 A | 7/2000 | Abecassis |
| 6,100,916 A | 8/2000 | August et al. |
| 6,104,334 A | 8/2000 | Allport |
| 6,104,423 A | 8/2000 | Elam |
| 6,124,877 A | 9/2000 | Schmidt |
| 6,125,259 A | 9/2000 | Perlman |
| 6,128,011 A | 10/2000 | Peng |
| 6,134,243 A | 10/2000 | Jones et al. |
| 6,144,401 A | 11/2000 | Casement et al. |
| 6,151,444 A | 11/2000 | Abecassis |
| 6,154,205 A | 11/2000 | Carroll et al. |
| 6,154,771 A | 11/2000 | Rangan et al. |
| 6,163,272 A | 12/2000 | Goode |
| 6,166,780 A | 12/2000 | Bray |
| 6,173,317 B1 | 1/2001 | Chaddha et al. |
| 6,173,437 B1 | 1/2001 | Polcyn |

(56) References Cited

U.S. PATENT DOCUMENTS

| | | |
|---|---|---|
| 6,175,718 B1 | 1/2001 | Kim et al. |
| 6,175,840 B1 | 1/2001 | Chen et al. |
| 6,177,931 B1 | 1/2001 | Alexander et al. |
| 6,178,446 B1 | 1/2001 | Gerszberg et al. |
| 6,195,090 B1 | 2/2001 | Riggins, III |
| 6,201,538 B1 | 3/2001 | Wugofski |
| 6,216,263 B1 | 4/2001 | Elam |
| 6,226,793 B1 | 5/2001 | Kwoh |
| 6,229,524 B1 | 5/2001 | Chernock et al. |
| 6,229,546 B1 | 5/2001 | Lancaster et al. |
| 6,230,172 B1 | 5/2001 | Purnaveja et al. |
| 6,240,555 B1 | 5/2001 | Shoff et al. |
| 6,256,785 B1 | 7/2001 | Klappert et al. |
| 6,263,189 B1 | 7/2001 | Reagor |
| 6,263,332 B1 | 7/2001 | Nasr et al. |
| 6,263,500 B1 | 7/2001 | Yoshida et al. |
| 6,266,793 B1 | 7/2001 | Mozdzen et al. |
| 6,269,216 B1 | 7/2001 | Abecassis |
| 6,292,805 B1 | 9/2001 | Basso et al. |
| 6,297,853 B1 | 10/2001 | Sharir et al. |
| 6,308,327 B1 | 10/2001 | Liu et al. |
| 6,314,568 B1 | 11/2001 | Ochiai et al. |
| 6,317,881 B1 | 11/2001 | Shah-Nazaroff et al. |
| 6,324,519 B1 | 11/2001 | Eldering |
| 6,330,719 B1 | 12/2001 | Zigmond et al. |
| 6,345,278 B1 | 2/2002 | Hitchcock et al. |
| 6,349,410 B1 | 2/2002 | Lortz |
| 6,356,933 B2 | 3/2002 | Mitchell et al. |
| 6,357,042 B2 | 3/2002 | Srinivasan et al. |
| 6,359,661 B1 | 3/2002 | Nickum |
| 6,363,380 B1 | 3/2002 | Dimitrova |
| 6,377,995 B2 | 4/2002 | Agraharam et al. |
| 6,404,445 B1 | 6/2002 | Galea et al. |
| 6,415,438 B1 | 7/2002 | Blackketter et al. |
| 6,426,778 B1 | 7/2002 | Valdez, Jr. |
| 6,438,752 B1 | 8/2002 | McClard |
| 6,446,246 B1 | 9/2002 | Suto |
| 6,446,261 B1 | 9/2002 | Rosser |
| 6,449,766 B1 | 9/2002 | Fleming |
| 6,449,767 B1 | 9/2002 | Krapf et al. |
| 6,463,585 B1 | 10/2002 | Hendricks et al. |
| 6,476,828 B1 | 11/2002 | Burkett et al. |
| 6,476,833 B1 | 11/2002 | Moshfeghi |
| 6,477,579 B1 | 11/2002 | Kunkel et al. |
| 6,481,011 B1 | 11/2002 | Lemmons |
| 6,483,547 B1 | 11/2002 | Eyer |
| 6,493,872 B1 | 12/2002 | Rangan et al. |
| 6,513,160 B2 | 1/2003 | Dureau |
| 6,519,770 B2 | 2/2003 | Ford |
| 6,551,357 B1 | 4/2003 | Madduri |
| 6,560,366 B1 | 5/2003 | Wilkins |
| 6,560,777 B2 | 5/2003 | Blackketter et al. |
| 6,581,207 B1 | 6/2003 | Sumita et al. |
| 6,594,825 B1 | 7/2003 | Goldschmidt Iki |
| 6,615,408 B1 | 9/2003 | Kaiser et al. |
| 6,675,384 B1 | 1/2004 | Block et al. |
| 6,675,388 B1 | 1/2004 | Beckmann et al. |
| 6,698,020 B1 | 2/2004 | Zigmond et al. |
| 6,721,954 B1 | 4/2004 | Nickum |
| 6,725,421 B1 | 4/2004 | Boucher et al. |
| 6,738,978 B1 | 5/2004 | Hendricks et al. |
| 6,760,043 B2 | 7/2004 | Markel |
| 6,766,524 B1 | 7/2004 | Matheny et al. |
| 6,785,902 B1 | 8/2004 | Zigmond et al. |
| 6,791,579 B2 | 9/2004 | Markel |
| 6,795,826 B2 | 9/2004 | Flinn et al. |
| 6,804,675 B1 | 10/2004 | Knight et al. |
| 6,826,597 B1 | 11/2004 | Lonnroth et al. |
| 6,828,993 B1 | 12/2004 | Hendricks et al. |
| 6,845,374 B1 | 1/2005 | Oliver et al. |
| 6,880,171 B1 | 4/2005 | Ahmad et al. |
| 6,938,270 B2 | 8/2005 | Blackketter et al. |
| 6,941,521 B2 | 9/2005 | Lin et al. |
| 7,353,235 B2 | 4/2008 | Sally et al. |
| 7,581,237 B1 | 8/2009 | Kurapati |
| 7,644,427 B1 | 1/2010 | Horvitz et al. |
| 7,739,604 B1 | 6/2010 | Lyons et al. |
| 7,757,250 B1 | 7/2010 | Horvitz et al. |
| 7,801,419 B2 | 9/2010 | Sakai et al. |
| 7,853,600 B2 | 12/2010 | Herz et al. |
| 7,904,924 B1 | 3/2011 | De Heer et al. |
| 7,937,725 B1 | 5/2011 | Schaffer et al. |
| 8,108,341 B2 | 1/2012 | Barsook et al. |
| 8,230,360 B2 | 7/2012 | Ma et al. |
| 8,234,147 B2 | 7/2012 | Olejniczak et al. |
| 8,286,206 B1 | 10/2012 | Aaron et al. |
| 8,311,875 B1 | 11/2012 | Lloyd |
| 8,346,624 B2 | 1/2013 | Goad et al. |
| 8,402,031 B2 | 3/2013 | Govani et al. |
| 8,429,530 B2 | 4/2013 | Neuman et al. |
| 8,515,975 B1 | 8/2013 | Federici |
| 8,539,359 B2 | 9/2013 | Rapaport et al. |
| 8,666,979 B2 | 3/2014 | Chen et al. |
| 8,677,235 B2 | 3/2014 | Chronister et al. |
| 8,803,882 B2 | 8/2014 | Lam et al. |
| 8,949,871 B2 | 2/2015 | Chai et al. |
| 9,009,768 B2 | 4/2015 | Agnihotri et al. |
| 9,135,333 B2 | 9/2015 | Cameron et al. |
| 9,595,300 B2 | 3/2017 | Duffin et al. |
| 9,602,563 B2 | 3/2017 | Barkai et al. |
| 9,678,623 B2 | 6/2017 | Neuman et al. |
| 9,699,503 B2 | 7/2017 | Fishman |
| 9,800,927 B2 | 10/2017 | Chai |
| 9,883,250 B2 | 1/2018 | Chai et al. |
| 10,080,060 B2 | 9/2018 | Fishman et al. |
| 10,129,600 B2 | 11/2018 | Fishman et al. |
| 10,210,160 B2 | 2/2019 | Fishman et al. |
| 10,419,817 B2 | 9/2019 | Fishman et al. |
| 10,595,094 B2 | 3/2020 | Fishman et al. |
| 11,074,308 B2 | 7/2021 | Fishman et al. |
| 2001/0011375 A1 | 8/2001 | Yun et al. |
| 2001/0021994 A1 | 9/2001 | Nash |
| 2001/0023436 A1 | 9/2001 | Srinivasan et al. |
| 2001/0037500 A1 | 11/2001 | Reynolds et al. |
| 2002/0010625 A1 | 1/2002 | Smith et al. |
| 2002/0010923 A1 | 1/2002 | Pack et al. |
| 2002/0011988 A1 | 1/2002 | Sai et al. |
| 2002/0023263 A1 | 2/2002 | Ahn et al. |
| 2002/0029256 A1 | 3/2002 | Zintel et al. |
| 2002/0035728 A1 | 3/2002 | Fries |
| 2002/0049983 A1 | 4/2002 | Bove, Jr. et al. |
| 2002/0049984 A1 | 4/2002 | Klappert et al. |
| 2002/0053084 A1 | 5/2002 | Escobar et al. |
| 2002/0056087 A1 | 5/2002 | Berezowski et al. |
| 2002/0056090 A1 | 5/2002 | Wagner et al. |
| 2002/0056136 A1 | 5/2002 | Wistendahl et al. |
| 2002/0057286 A1 | 5/2002 | Markel |
| 2002/0057837 A1 | 5/2002 | Wilkinson et al. |
| 2002/0059117 A1 | 5/2002 | Yoch et al. |
| 2002/0059588 A1 | 5/2002 | Huber et al. |
| 2002/0059590 A1 | 5/2002 | Kitsukawa et al. |
| 2002/0059593 A1 | 5/2002 | Shao et al. |
| 2002/0059629 A1 | 5/2002 | Markel |
| 2002/0065678 A1 | 5/2002 | Peliotis et al. |
| 2002/0069405 A1 | 6/2002 | Chapin et al. |
| 2002/0073416 A1 | 6/2002 | Ramsey Catan |
| 2002/0088008 A1 | 7/2002 | Markel |
| 2002/0088011 A1 | 7/2002 | Lamkin et al. |
| 2002/0089542 A1 | 7/2002 | Imamura |
| 2002/0095687 A1 | 7/2002 | Shintani et al. |
| 2002/0112239 A1* | 8/2002 | Goldman .......... H04N 21/25891 348/E7.075 |
| 2002/0112249 A1 | 8/2002 | Hendricks et al. |
| 2002/0120931 A1 | 8/2002 | Huber et al. |
| 2002/0126990 A1 | 9/2002 | Rasmussen et al. |
| 2002/0129364 A1 | 9/2002 | Smith et al. |
| 2002/0131511 A1 | 9/2002 | Zenoni |
| 2002/0133817 A1 | 9/2002 | Markel |
| 2002/0147987 A1 | 10/2002 | Reynolds et al. |
| 2002/0162117 A1 | 10/2002 | Pearson et al. |
| 2002/0162121 A1 | 10/2002 | Mitchell |
| 2002/0166119 A1 | 11/2002 | Cristofalo |
| 2002/0174425 A1 | 11/2002 | Markel et al. |
| 2003/0020744 A1 | 1/2003 | Ellis et al. |

(56) References Cited

U.S. PATENT DOCUMENTS

| | | |
|---|---|---|
| 2003/0028873 A1 | 2/2003 | Lemmons |
| 2003/0037334 A1 | 2/2003 | Khoo et al. |
| 2003/0066085 A1 | 4/2003 | Boyer et al. |
| 2003/0093790 A1 | 5/2003 | Logan et al. |
| 2003/0149983 A1 | 8/2003 | Markel |
| 2003/0172374 A1 | 9/2003 | Vinson et al. |
| 2003/0177199 A1 | 9/2003 | Zenoni |
| 2003/0196164 A1 | 10/2003 | Gupta et al. |
| 2003/0217365 A1 | 11/2003 | Caputo |
| 2003/0236695 A1 | 12/2003 | Litwin, Jr. |
| 2003/0237093 A1 | 12/2003 | Marsh et al. |
| 2004/0021679 A1 | 2/2004 | Chapman et al. |
| 2004/0031062 A1 | 2/2004 | Lemmons |
| 2004/0054572 A1 | 3/2004 | Oldale et al. |
| 2004/0056900 A1 | 3/2004 | Blume |
| 2004/0073953 A1 | 4/2004 | Xu et al. |
| 2004/0163045 A1 | 8/2004 | Hui et al. |
| 2004/0210947 A1 | 10/2004 | Shusman |
| 2004/0237108 A1 | 11/2004 | Drazin et al. |
| 2005/0028194 A1 | 2/2005 | Elenbaas et al. |
| 2005/0038717 A1 | 2/2005 | McQueen et al. |
| 2005/0144499 A1 | 6/2005 | Narahara et al. |
| 2005/0149964 A1 | 7/2005 | Thomas et al. |
| 2005/0160458 A1 | 7/2005 | Baumgartner |
| 2005/0262542 A1 | 11/2005 | DeWeese et al. |
| 2006/0008256 A1 | 1/2006 | Khedouri et al. |
| 2006/0010464 A1 | 1/2006 | Azami |
| 2006/0123448 A1 | 6/2006 | Ma et al. |
| 2006/0200434 A1 | 9/2006 | Flinn et al. |
| 2006/0242554 A1 | 10/2006 | Gerace et al. |
| 2006/0277098 A1 | 12/2006 | Chung et al. |
| 2006/0282328 A1 | 12/2006 | Gerace et al. |
| 2007/0011702 A1 | 1/2007 | Vaysman |
| 2007/0033607 A1 | 2/2007 | Bryan |
| 2007/0041705 A1 | 2/2007 | Bontempi |
| 2007/0043617 A1 | 2/2007 | Stein et al. |
| 2007/0061745 A1 | 3/2007 | Anthony et al. |
| 2007/0100824 A1 | 5/2007 | Richardson et al. |
| 2007/0136753 A1 | 6/2007 | Bovenschulte et al. |
| 2007/0157242 A1 | 7/2007 | Cordray et al. |
| 2007/0157248 A1 | 7/2007 | Ellis |
| 2007/0186243 A1 | 8/2007 | Pettit et al. |
| 2007/0192794 A1 | 8/2007 | Curtis et al. |
| 2007/0220543 A1 | 9/2007 | Shanks et al. |
| 2007/0266401 A1 | 11/2007 | Hallberg |
| 2007/0271518 A1* | 11/2007 | Tischer ............ H04N 21/4532 715/744 |
| 2008/0006601 A1 | 3/2008 | Brodersen et al. |
| 2008/0092173 A1 | 4/2008 | Shannon et al. |
| 2008/0117202 A1 | 5/2008 | Martinez et al. |
| 2008/0134053 A1 | 6/2008 | Fischer |
| 2008/0155588 A1* | 6/2008 | Roberts ............ H04N 21/25808 725/34 |
| 2008/0163059 A1 | 7/2008 | Craner |
| 2008/0178239 A1 | 7/2008 | Yampanis |
| 2008/0222106 A1 | 9/2008 | Rao et al. |
| 2008/0276277 A1 | 11/2008 | Ahn et al. |
| 2008/0301118 A1 | 12/2008 | Chien et al. |
| 2008/0320517 A1 | 12/2008 | Beadle et al. |
| 2009/0006374 A1 | 1/2009 | Kim et al. |
| 2009/0006398 A1 | 1/2009 | Lam et al. |
| 2009/0031354 A1 | 1/2009 | Riley et al. |
| 2009/0037254 A1 | 2/2009 | Colando |
| 2009/0046101 A1 | 2/2009 | Askey et al. |
| 2009/0052859 A1 | 2/2009 | Greenberger et al. |
| 2009/0060469 A1 | 3/2009 | Olague et al. |
| 2009/0070185 A1 | 3/2009 | Farrelly |
| 2009/0083326 A1 | 3/2009 | Pelton |
| 2009/0089433 A1 | 4/2009 | Kisel et al. |
| 2009/0092183 A1 | 4/2009 | O'hern |
| 2009/0100469 A1 | 4/2009 | Conradt et al. |
| 2009/0119258 A1* | 5/2009 | Petty ..................... G06Q 10/10 |
| 2009/0133051 A1 | 5/2009 | Hildreth |
| 2009/0133070 A1 | 5/2009 | Hamano et al. |
| 2009/0133078 A1 | 5/2009 | Hamano et al. |
| 2009/0138805 A1 | 5/2009 | Hildreth |
| 2009/0144773 A1 | 6/2009 | Cavanaugh et al. |
| 2009/0150214 A1 | 6/2009 | Mohan |
| 2009/0150786 A1 | 6/2009 | Brown |
| 2009/0158337 A1 | 6/2009 | Stiers et al. |
| 2009/0163183 A1 | 6/2009 | O'donoghue et al. |
| 2009/0164450 A1 | 6/2009 | Martinez et al. |
| 2009/0182725 A1 | 7/2009 | Govani et al. |
| 2009/0210902 A1 | 8/2009 | Slaney et al. |
| 2009/0217324 A1 | 8/2009 | Massimi |
| 2009/0249393 A1 | 10/2009 | Shelton et al. |
| 2009/0265359 A1 | 10/2009 | Barsook et al. |
| 2010/0031366 A1 | 2/2010 | Knight et al. |
| 2010/0042608 A1* | 2/2010 | Kane, Jr. ............. G06F 16/9535 707/E17.014 |
| 2010/0050098 A1* | 2/2010 | Turner ............. H04N 21/25808 725/34 |
| 2010/0058241 A1 | 3/2010 | Saijo et al. |
| 2010/0071000 A1 | 3/2010 | Amento et al. |
| 2010/0083318 A1 | 4/2010 | Weare et al. |
| 2010/0088312 A1 | 4/2010 | Goldfeder |
| 2010/0100537 A1 | 4/2010 | Druzgalski et al. |
| 2010/0124911 A1 | 5/2010 | Leeder |
| 2010/0201618 A1 | 8/2010 | Lorente |
| 2010/0235745 A1 | 9/2010 | Shintani |
| 2010/0293034 A1 | 11/2010 | Olejniczak et al. |
| 2011/0035707 A1 | 2/2011 | Kitayama |
| 2011/0060649 A1 | 3/2011 | Dunk et al. |
| 2011/0069940 A1 | 3/2011 | Shimy et al. |
| 2011/0078717 A1 | 3/2011 | Drummond et al. |
| 2011/0145040 A1 | 6/2011 | Zahn et al. |
| 2011/0162008 A1 | 6/2011 | Aldrey et al. |
| 2011/0175867 A1 | 7/2011 | Satake |
| 2011/0225290 A1 | 9/2011 | Kansal et al. |
| 2011/0239158 A1 | 9/2011 | Barraclough et al. |
| 2011/0247044 A1 | 10/2011 | Jacoby |
| 2011/0279311 A1 | 11/2011 | Hamano |
| 2011/0283189 A1 | 11/2011 | Mccarty |
| 2011/0283304 A1 | 11/2011 | Roberts et al. |
| 2011/0289189 A1 | 11/2011 | Bartholomew |
| 2011/0289422 A1 | 11/2011 | Spivack et al. |
| 2011/0310305 A1 | 12/2011 | Alexander |
| 2011/0320715 A1 | 12/2011 | Ickman et al. |
| 2012/0059825 A1 | 3/2012 | Fishman et al. |
| 2012/0060094 A1 | 3/2012 | Irwin et al. |
| 2012/0060176 A1 | 3/2012 | Chai et al. |
| 2012/0060195 A1 | 3/2012 | Fishman et al. |
| 2012/0137316 A1 | 5/2012 | Elizarov et al. |
| 2012/0197930 A1 | 8/2012 | Newell et al. |
| 2012/0278331 A1 | 11/2012 | Campbell et al. |
| 2012/0311453 A1 | 12/2012 | Reyna et al. |
| 2013/0066885 A1 | 3/2013 | Komuves |
| 2013/0073988 A1 | 3/2013 | Groten et al. |
| 2013/0086159 A1 | 4/2013 | Gharachorloo et al. |
| 2013/0152129 A1 | 6/2013 | Alberth et al. |
| 2013/0167168 A1 | 6/2013 | Ellis et al. |
| 2013/0204825 A1 | 8/2013 | Su |
| 2013/0204833 A1 | 8/2013 | Pang et al. |
| 2013/0205314 A1 | 8/2013 | Ramaswamy et al. |
| 2013/0212493 A1 | 8/2013 | Krishnamurthy |
| 2014/0052785 A1 | 2/2014 | Sirpal |
| 2014/0068689 A1 | 3/2014 | Sirpal et al. |
| 2014/0081954 A1 | 3/2014 | Elizarov |
| 2014/0215512 A1 | 7/2014 | Maruyama et al. |
| 2014/0365873 A1 | 12/2014 | Willis et al. |
| 2015/0006280 A1 | 1/2015 | Ruiz et al. |
| 2015/0033109 A1 | 1/2015 | Marek |
| 2015/0074552 A1 | 3/2015 | Chai et al. |
| 2015/0074721 A1 | 3/2015 | Fishman et al. |
| 2015/0074728 A1 | 3/2015 | Chai et al. |
| 2015/0121406 A1 | 4/2015 | Chai et al. |
| 2015/0206269 A1 | 7/2015 | Qin |
| 2018/0020255 A1 | 1/2018 | Fishman et al. |
| 2018/0035161 A1 | 2/2018 | Fishman et al. |
| 2018/0220194 A1 | 8/2018 | Chai et al. |
| 2018/0234736 A1 | 8/2018 | Fishman et al. |
| 2019/0045272 A1 | 2/2019 | Fishman et al. |
| 2019/0258689 A1 | 8/2019 | Fishman et al. |
| 2020/0045369 A1 | 2/2020 | Fishman et al. |

(56) References Cited

U.S. PATENT DOCUMENTS

FOREIGN PATENT DOCUMENTS

| CA | 2810511 C | 2/2021 |
|---|---|---|
| CN | 106462316 A | 2/2017 |
| EP | 0262757 A2 | 4/1988 |
| EP | 0921696 A1 | 6/1999 |
| EP | 0967804 A2 | 12/1999 |
| EP | 0982943 A2 | 3/2000 |
| EP | 1021036 A2 | 7/2000 |
| EP | 0967804 A3 | 11/2000 |
| EP | 1056273 A2 | 11/2000 |
| EP | 1071287 A2 | 1/2001 |
| EP | 1056273 A3 | 1/2002 |
| EP | 2490454 A2 | 8/2012 |
| EP | 2614444 A1 | 7/2013 |
| FR | 2730837 A1 | 2/1995 |
| GB | 2327837 A | 2/1999 |
| JP | 10042271 A | 2/1998 |
| JP | 2000227851 A | 8/2000 |
| JP | 2003308145 A | 10/2003 |
| WO | WO-9115921 A1 | 10/1991 |
| WO | WO-9510919 A1 | 4/1995 |
| WO | WO-9625821 A1 | 8/1996 |
| WO | WO-9633572 A1 | 10/1996 |
| WO | WO-9637075 A1 | 11/1996 |
| WO | WO-9749236 A1 | 12/1997 |
| WO | WO-9749239 A1 | 12/1997 |
| WO | WO-9831114 A1 | 7/1998 |
| WO | WO-9915968 A1 | 4/1999 |
| WO | WO-1999031881 A1 | 6/1999 |
| WO | WO-9935832 A1 | 7/1999 |
| WO | WO-0005884 A1 | 2/2000 |
| WO | WO-0038427 A1 | 6/2000 |
| WO | WO-0049520 A1 | 8/2000 |
| WO | WO-0049801 A1 | 8/2000 |
| WO | WO-0057295 A1 | 9/2000 |
| WO | WO-0128235 A1 | 4/2001 |
| WO | WO-2001050752 A1 | 7/2001 |
| WO | WO-0199416 A2 | 12/2001 |
| WO | WO-0232136 A2 | 4/2002 |
| WO | WO-2002032136 A2 | 4/2002 |
| WO | WO-2012033489 A1 | 3/2012 |
| WO | WO-2012033921 A1 | 3/2012 |
| WO | WO-2015038515 A1 | 3/2015 |
| WO | WO-2015038516 A1 | 3/2015 |

OTHER PUBLICATIONS

"About TVML", Product Documentation, [Online], Retrieved from the Internet: <URL: http://web.archive.org/web/19961214195058/http://www.tvml.co.uk/developer/about.htm>, (1996), 2 pgs.
"U.S. Appl. No. 09/941,148, Advisory Action dated May 20, 2004", 3 pgs.
"U.S. Appl. No. 09/941,148, Amendment filed Apr. 26, 2004", 14 pgs.
"U.S. Appl. No. 09/941,148, Amendment filed Sep. 19, 2005", 17 pgs.
"U.S. Appl. No. 09/941,148, Examiner Interview Summary dated May 27, 2005", 2 pgs.
"U.S. Appl. No. 09/941,148, Final Office Action dated Apr. 25, 2007", 18 pgs.
"U.S. Appl. No. 09/941,148, Final Office Action dated May 19, 2005", 10 pgs.
"U.S. Appl. No. 09/941,148, Final Office Action dated Oct. 24, 2003", 11 pgs.
"U.S. Appl. No. 09/941,148, Non Final Office Action dated Apr. 1, 2003", 8 pgs.
"U.S. Appl. No. 09/941,148, Non Final Office Action dated Aug. 2, 2006", 16 pgs.
"U.S. Appl. No. 09/941,148, Non Final Office Action dated Aug. 11, 2004", 13 pgs.
"U.S. Appl. No. 09/941,148, Non Final Office Action dated Nov. 28, 2005", 19 pgs.
"U.S. Appl. No. 09/941,148, Preliminary Amendment filed Jun. 19, 2002", 1 pg.
"U.S. Appl. No. 09/941,148, Response filed Feb. 2, 2007 to Non Final Office Action dated Aug. 2, 2006", 17 pgs.
"U.S. Appl. No. 09/941,148, Response filed Jul. 31, 2003 to Non Final Office Action dated Apr. 1, 2003", 10 pgs.
"U.S. Appl. No. 09/941,148, Response filed Nov. 12, 2004 to Non Final Office Action dated Aug. 11, 2004", 15 pgs.
"U.S. Appl. No. 12/877,034, Appeal Brief filed Jun. 11, 2015", 21 pgs.
"U.S. Appl. No. 12/877,034, Appeal Decision mailed Jan. 3, 2017", 10 pgs.
"U.S. Appl. No. 12/877,034, Decision on Pre-Appeal Brief Request mailed Dec. 11, 2014", 2 pgs.
"U.S. Appl. No. 12/877,034, Examiner Interview Summary dated Jul. 24, 2013", 3 pgs.
"U.S. Appl. No. 12/877,034, Final Office Action dated Mar. 25, 2013", 14 pgs.
"U.S. Appl. No. 12/877,034, Final Office Action dated Jun. 13, 2014", 14 pgs.
"U.S. Appl. No. 12/877,034, Non Final Office Action dated Aug. 10, 2012", 11 pgs.
"U.S. Appl. No. 12/877,034, Non Final Office Action dated Oct. 1, 2013", 13 pgs.
"U.S. Appl. No. 12/877,034, Notice of Allowance dated Mar. 29, 2017", 9 pgs.
"U.S. Appl. No. 12/877,034, Pre-Appeal Brief Request filed Nov. 4, 2014", 5 pgs.
"U.S. Appl. No. 12/877,034, Response filed Feb. 26, 2014 to Non Final Office Action dated Oct. 1, 2013", 13 lpgs.
"U.S. Appl. No. 12/877,034, Response filed Aug. 26, 2013 to Final Office Action dated Mar. 25, 2013", 12 pgs.
"U.S. Appl. No. 12/877,034, Response filed Nov. 13, 2012 to Non Final Office Action dated Aug. 10, 2012", 11 pgs.
"U.S. Appl. No. 12/877,875, Advisory Action dated Aug. 2, 2013", 3 pgs.
"U.S. Appl. No. 12/877,875, Final Office Action dated Apr. 23, 2013", 12 pgs.
"U.S. Appl. No. 12/877,875, Non Final Office Action dated Apr. 15, 2014", 13 pgs.
"U.S. Appl. No. 12/877,875, Non Final Office Action dated Nov. 6, 2012", 13 pgs.
"U.S. Appl. No. 12/877,875, Notice of Allowance dated Sep. 17, 2014", 12 pgs.
"U.S. Appl. No. 12/877,875, Response filed Mar. 11, 2013 to Non Final Office Action dated Nov. 6, 2012", 10 pgs.
"U.S. Appl. No. 12/877,875, Response filed Jul. 16, 2013 to Final Office Action dated Apr. 23, 2013", 11 pgs.
"U.S. Appl. No. 12/877,875, Response filed Aug. 15, 2014 to Non Final Office Action dated Apr. 15, 2014", 12 pgs.
"U.S. Appl. No. 12/877,993, Amendment with Request to Reopen Prosecution filed Jul. 7, 2017", 18 pgs.
"U.S. Appl. No. 12/877,993, Appeal Brief filed Feb. 24, 2016", 20 pgs.
"U.S. Appl. No. 12/877,993, Appeal Decision mailed May 8, 2017", 9 pgs.
"U.S. Appl. No. 12/877,993, Examiner Interview Summary dated Mar. 19, 2018", 3 pgs.
"U.S. Appl. No. 12/877,993, Examiner Interview Summary dated May 21, 2019", 3 pgs.
"U.S. Appl. No. 12/877,993, Final Office Action dated Jan. 28, 2015", 35 pgs.
"U.S. Appl. No. 12/877,993, Final Office Action dated Mar. 15, 2013", 30 pgs.
"U.S. Appl. No. 12/877,993, Final Office Action dated Jul. 9, 2018", 37 pgs.
"U.S. Appl. No. 12/877,993, Final Office Action dated Jul. 23, 2019", 35 pgs.
"U.S. Appl. No. 12/877,993, Non Final Office Action maidated led Feb. 4, 2019", 34 pgs.

(56) References Cited

OTHER PUBLICATIONS

"U.S. Appl. No. 12/877,993, Non Final Office Action dated Jun. 20, 2014", 31 pgs.
"U.S. Appl. No. 12/877,993, Non Final Office Action dated Aug. 2, 2012", 26 pgs.
"U.S. Appl. No. 12/877,993, Non Final Office Action dated Dec. 15, 2017", 36 pgs.
"U.S. Appl. No. 12/877,993, Response filed Mar. 15, 2018 to Non Final Office Action dated Dec. 15, 2017", 25 pgs.
"U.S. Appl. No. 12/877,993, Response filed May 6, 2019 to Non Final Office Action dated Feb. 4, 2019", 15 pgs.
"U.S. Appl. No. 12/877,993, Response filed Jul. 22, 2013 to Final Office Action dated Mar. 15, 2013", 17 pgs.
"U.S. Appl. No. 12/877,993, Response filed Oct. 14, 2014 to Non Final Office Action dated Jun. 20, 2014", 19 pgs.
"U.S. Appl. No. 12/877,993, Response filed Nov. 8, 2018 to Final Office Action dated Jul. 9, 2018", 15 pgs.
"U.S. Appl. No. 12/877,993, Response filed Dec. 3, 2012 to Non Final Office Action dated Aug. 2, 2012", 17 pgs.
"U.S. Appl. No. 12/878,001, Appeal Brief filed May 12, 2015", 16 pgs.
"U.S. Appl. No. 12/878,001, Appeal Decision dated Mar. 20, 2017", 10 pgs.
"U.S. Appl. No. 12/878,001, Examiner Interview Summary dated Jul. 24, 2013", 3 pgs.
"U.S. Appl. No. 12/878,001, Examiner Interview Summary dated Jul. 27, 2018", 3 pgs.
"U.S. Appl. No. 12/878,001, Examiner Interview Summary dated Dec. 18, 2017", 3 pgs.
"U.S. Appl. No. 12/878,001, Final Office Action dated Mar. 29, 2013", 13 pgs.
"U.S. Appl. No. 12/878,001, Final Office Action dated Apr. 23, 2018", 18 pgs.
"U.S. Appl. No. 12/878,001, Final Office Action dated Jul. 17, 2014", 12 pgs.
"U.S. Appl. No. 12/878,001, Non Final Office Action dated Aug. 9, 2012", 11 pgs.
"U.S. Appl. No. 12/878,001, Non Final Office Action dated Aug. 24, 2017", 14 pgs.
"U.S. Appl. No. 12/878,001, Non Final Office Action dated Oct. 3, 2013", 12 pgs.
"U.S. Appl. No. 12/878,001, Notice of Allowance dated Oct. 2, 2018", 12 pgs.
"U.S. Appl. No. 12/878,001, Request to Reopen Prosecution under 37 C.F.R. 41.50 filed May 19, 2017", 8 pgs.
"U.S. Appl. No. 12/878,001, Response filed Apr. 1, 2014 to Non Final Office Action dated Oct. 3, 2013", 13 pgs.
"U.S. Appl. No. 12/878,001, Response filed Jul. 23, 2018 to Final Office Action dated Apr. 23, 2018", 12 pgs.
"U.S. Appl. No. 12/878,001, Response filed Aug. 23, 2013 to Final Office Action dated Mar. 29, 2013", 12 pgs.
"U.S. Appl. No. 12/878,001, Response filed Nov. 9, 2012 to Non Final Office Action dated Aug. 9, 2012", 11 pgs.
"U.S. Appl. No. 12/878,001, Response filed Dec. 22, 2017 to Non Final Office Action dated Aug. 24, 2017", 16 pgs.
"U.S. Appl. No. 14/242,459, Advisory Action dated Sep. 2, 2015", 6 pgs.
"U.S. Appl. No. 14/242,459, Appeal Brief filed Dec. 4, 2015", 17 pgs.
"U.S. Appl. No. 14/242,459, Applicant Summary of Interview with Examiner filed Sep. 15, 2015", 2 pgs.
"U.S. Appl. No. 14/242,459, Applicant Summary of Interview with Examiner filed Nov. 17, 2015", 4 pgs.
"U.S. Appl. No. 14/242,459, Decision on Pre-Appeal Brief Request mailed Nov. 4, 2015", 4 pgs.
"U.S. Appl. No. 14/242,459, Examiner Interview Summary dated Mar. 3, 2015", 3 pgs.
"U.S. Appl. No. 14/242,459, Examiner Interview Summary dated Jul. 21, 2015", 3 pgs.
"U.S. Appl. No. 14/242,459, Examiner Interview Summary dated Nov. 17, 2015", 3 pgs.
"U.S. Appl. No. 14/242,459, Examiners Answer to Appeal Brief mailed Jul. 12, 2016", 18 pgs.
"U.S. Appl. No. 14/242,459, Final Office Action dated Jun. 19, 2015", 21 pgs.
"U.S. Appl. No. 14/242,459, Non Final Office Action dated Jan. 5, 2015", 11 pgs.
"U.S. Appl. No. 14/242,459, Pre-Brief Conference request filed Sep. 15, 2015", 5 pgs.
"U.S. Appl. No. 14/242,459, Response filed Feb. 19, 2015 to Non Final Office Action dated Jan. 5, 2015", 9 pgs.
"U.S. Appl. No. 14/242,459, Response filed Jul. 21, 2015 to Final Office Action dated Jun. 19, 2015", 11 pgs.
"U.S. Appl. No. 14/260,677, Advisory Action dated Dec. 9, 2016", 3 pgs.
"U.S. Appl. No. 14/260,677, Advisory Action dated Dec. 28, 2016", 5 pgs.
"U.S. Appl. No. 14/260,677, Corrected Notice of Allowance dated Nov. 3, 2017", 2 pgs.
"U.S. Appl. No. 14/260,677, Examiner Interview Summary dated Aug. 28, 2017", 3 pgs.
"U.S. Appl. No. 14/260,677, Final Office Action dated Sep. 23, 2016", 20 pgs.
"U.S. Appl. No. 14/260,677, Non Final Office Action dated Jun. 6, 2017", 18 pgs.
"U.S. Appl. No. 14/260,677, Non Final Office Action dated Jun. 7, 2016", 15 pgs.
"U.S. Appl. No. 14/260,677, Notice of Allowability dated Sep. 25, 2017", 2 pgs.
"U.S. Appl. No. 14/260,677, Notice of Allowance dated Sep. 12, 2017", 7 pgs.
"U.S. Appl. No. 14/260,677, Response filed Aug. 29, 2017 to Non Final Office Action dated Jun. 6, 2017", 11 pgs.
"U.S. Appl. No. 14/260,677, Response filed Sep. 6, 2016 to Non Final Office Action dated Jun. 7, 2016", 9 pgs.
"U.S. Appl. No. 14/260,677, Response filed Dec. 1, 2016 to Final Office Action dated Sep. 23, 2016", 11 pgs.
"U.S. Appl. No. 14/336,758, Advisory Action dated Mar. 9, 2016", 3 pgs.
"U.S. Appl. No. 14/336,758, Appeal Brief filed May 20, 2016", 18 pgs.
"U.S. Appl. No. 14/336,758, Appeal Decision mailed May 17, 2017", 6 pgs.
"U.S. Appl. No. 14/336,758, Examiner Interview Summary dated Dec. 20, 2017", 3 pgs.
"U.S. Appl. No. 14/336,758, Examiners Answer to Appeal Brief mailed Jul. 12, 2016", 13 pgs.
"U.S. Appl. No. 14/336,758, Final Office Action dated Nov. 25, 2015", 11 pgs.
"U.S. Appl. No. 14/336,758, Non Final Office Action dated Jan. 29, 2015", 10 pgs.
"U.S. Appl. No. 14/336,758, Non Final Office Action dated Jul. 23, 2015", 10 pgs.
"U.S. Appl. No. 14/336,758, Notice of Allowance dated May 4, 2018", 8 pgs.
"U.S. Appl. No. 14/336,758, Notice of Allowance dated Aug. 1, 2017", 8 pgs.
"U.S. Appl. No. 14/336,758, Notice of Allowance dated Sep. 14, 2017", 8 pgs.
"U.S. Appl. No. 14/336,758, PTO Response to Rule 312 Communication dated Dec. 21, 2017", 2 pgs.
"U.S. Appl. No. 14/336,758, Reply Brief filed Aug. 31, 2016", 4 pgs.
"U.S. Appl. No. 14/336,758, Response filed Feb. 25, 2016 to Final Office Action dated Nov. 25, 2015", 5 pgs.
"U.S. Appl. No. 14/336,758, Response filed Apr. 28, 2015 to Non Final Office Action dated Jan. 29, 2015", 10 pgs.
"U.S. Appl. No. 14/336,758, Response filed Sep. 22, 2015 to Non Final Office Action dated Jul. 23, 2015", 14 pgs.
"U.S. Appl. No. 14/588,871, Final Office Action dated Mar. 7, 2016", 12 pgs.

(56) References Cited

OTHER PUBLICATIONS

"U.S. Appl. No. 14/588,871, Final Office Action dated Mar. 31, 2017", 17 pgs.
"U.S. Appl. No. 14/588,871, Non Final Office Action dated Jun. 29, 2015", 13 pgs.
"U.S. Appl. No. 14/588,871, Non Final Office Action dated Sep. 9, 2016", 12 pgs.
"U.S. Appl. No. 14/588,871, Non Final Office Action dated Sep. 15, 2016", 16 pgs.
"U.S. Appl. No. 14/588,871, Notice of Allowance dated Jun. 26, 2017", 5 pgs.
"U.S. Appl. No. 14/588,871, Notice of Allowance dated Sep. 12, 2017", 2 pgs.
"U.S. Appl. No. 14/588,871, Preliminary Amendment filed Jan. 27, 2015", 8 pgs.
"U.S. Appl. No. 14/588,871, Response filed Jan. 17, 2017 to Non Final Office Action dated Sep. 15, 2016", 20 pgs.
"U.S. Appl. No. 14/588,871, Response filed May 31, 2017 to Final Office Action dated Mar. 31, 2017", 19 pgs.
"U.S. Appl. No. 14/588,871, Response filed Jul. 7, 2016 Final Office Action dated Mar. 7, 2016", 12 pgs.
"U.S. Appl. No. 14/588,871, Response filed Oct. 29, 2015 to Non Final Office Action dated Jun. 29, 2015", 11 pgs.
"U.S. Appl. No. 14/588,871, Supplemental Notice of Allowability dated Jul. 17, 2017", 2 pgs.
"U.S. Appl. No. 15/637,561, Advisory Action dated Mar. 6, 2019", 3 pgs.
"U.S. Appl. No. 15/637,561, Final Office Action dated Nov. 26, 2018", 20 pgs.
"U.S. Appl. No. 15/637,561, Non Final Office Action dated Apr. 23, 2018", 22 pgs.
"U.S. Appl. No. 15/637,561, Notice of Allowance dated Apr. 18, 2019", 12 pgs.
"U.S. Appl. No. 15/637,561, Preliminary Amendment filed Oct. 5, 2017", 7 pgs.
"U.S. Appl. No. 15/637,561, Response filed Jan. 22, 2019 to Final Office Action dated Nov. 26, 2018", 11 pgs.
"U.S. Appl. No. 15/637,561, Response filed Jul. 23, 2018 to Non Final Office Action dated Apr. 23, 2018", 11 pgs.
"U.S. Appl. No. 15/637,561, Resposne filed Mar. 26, 2019 to Final Office Action dated Nov. 26, 2018", 8 pgs.
"U.S. Appl. No. 15/726,102, Non Final Office Action dated Apr. 18, 2018", 32 pgs.
"U.S. Appl. No. 15/726,102, Preliminary Amendment filed Oct. 6, 2017", 7 pgs.
"U.S. Appl. No. 15/841,904, Notice of Allowance dated Jul. 2, 2018", 8 pgs.
"U.S. Appl. No. 15/841,904, Preliminary Amendment filed May 8, 2018", 8 pgs.
"U.S. Appl. No. 15/882,472, Preliminary Amendment Filed Apr. 23, 2018", 7 pgs.
"U.S. Appl. No. 16/237,022, Corrected Notice of Allowability dated Jan. 25, 2021", 7 pgs.
"U.S. Appl. No. 16/237,022, Corrected Notice of Allowability dated Feb. 18, 2021", 7 pgs.
"U.S. Appl. No. 16/237,022, Corrected Notice of Allowability dated Apr. 14, 2021", 2 pgs.
"U.S. Appl. No. 16/237,022, Examiner Interview Summary dated Apr. 17, 2020", 3 pgs.
"U.S. Appl. No. 16/237,022, Final Office Action dated Sep. 3, 2020", 27 pgs.
"U.S. Appl. No. 16/237,022, Non Final Office Action dated Jan. 21, 2020", 34 pgs.
"U.S. Appl. No. 16/237,022, Notice of Allowance dated Apr. 5, 2021", 9 pgs.
"U.S. Appl. No. 16/237,022, Notice of Allowance dated Dec. 24, 2020", 10 pgs.
"U.S. Appl. No. 16/237,022, Preliminary Amendment Filed May 14, 2019", 8 pgs.
"U.S. Appl. No. 16/237,022, Response filed Apr. 21, 2020 to Non Final Office Action dated Jan. 21, 2020", 12 pgs.
"U.S. Appl. No. 16/237,022, Response filed Dec. 3, 2020 to Final Office Action dated Sep. 3, 2020", 10 pgs.
"U.S. Appl. No. 16/511,648, Final Office Action dated Feb. 25, 2021", 24 pgs.
"U.S. Appl. No. 16/511,648, Non Final Office Action dated Sep. 29, 2020", 17 pgs.
"U.S. Appl. No. 16/511,648, Preliminary Amendment Filed Oct. 29, 2019", 6 pgs.
"U.S. Appl. No. 16/511,648, Response filed Dec. 22, 2020 to Non Final Office Action dated Sep. 29, 2020", 10 pgs.
"Australian Application Serial No. 2011101152, Examination Report No. 1 dated May 6, 2013", 4 pgs.
"Australian Application Serial No. 2011101152, Response filed Sep. 17, 2013 to Examination Report No. 1 dated May 6, 2013", 13 pgs.
"Australian Application Serial No. 2011299221, Response filed Jan. 15, 2015", 19 pgs.
"Australian Application Serial No. 2011299234, Amendment filed Apr. 4, 2013", 11 pgs.
"Australian Application Serial No. 2011299234, Amendment filed Aug. 25, 2015", 26 pgs.
"Australian Application Serial No. 2011299234, First Examiner Report dated Aug. 25, 2014", 3 pgs.
"Australian Application Serial No. 2011299234, Response filed Oct. 26, 2015 to Subsequent Examiners Report dated Sep. 4, 2015", 3 pgs.
"Australian Application Serial No. 2011299234, Subsequent Examiners Report dated Sep. 4, 2015", 4 pgs.
"Australian Application Serial No. 2016201377, First Examiner Report dated Feb. 1, 2017", 3 pgs.
"Australian Application Serial No. 2016201377, Response filed May 25, 2017 to First Examiner Report dated Feb. 1, 2017", 55 pgs.
"Australian Application Serial No. 2016201377, Response filed Aug. 9, 2017 to Subsequent Examiners Report dated Jun. 6, 2017", 2 pgs.
"Australian Application Serial No. 2016201377, Subsequent Examiners Report dated Jun. 6, 2017", 3 pgs.
"Australian Application Serial No. 2016201377, Subsequent Examiners Report dated Aug. 23, 2017", 3 pgs.
"Australian Serial No. 2011299221, First Examiner Report dated May 2, 2014", 3 pgs.
"Brazil Application Serial No. BR1120130055251, Final Office Action dated Feb. 19, 2021", with English translation, 7 pages.
"Brazil Application Serial No. BR1120130055251, Office Action dated Sep. 24, 2019", w/English translation, 7 pgs.
"Brazil Application Serial No. BR1120130055251, Office Action dated Nov. 13, 2020", with English translation, 7 pages.
"Brazil Application Serial No. BR1120130055251, Response filed Feb. 11, 2021 to Office Action dated Nov. 13, 2020", with English claims, 40 pages.
"Brazil Application Serial No. BR1120130055251, Response filed Dec. 23, 2019 to Office Action dated Sep. 24, 2019", w/English Claims, 32 pgs.
"Brazil Application Serial No. BR1120130056967, Office Action dated Jul. 13, 2020", with English translation, 8 pages.
"Brazil Application Serial No. BR1120130056967, Office Action dated Nov. 5, 2019", W/English Translation, 7 pgs.
"Brazil Application Serial No. BR1120130056967, Office Action dated Nov. 26, 2020", with English translation, 7 pages.
"Brazil Application Serial No. BR1120130056967, Response filed Jan. 28, 2021 to Office Action dated Nov. 26, 2020", with English claims, 18 pages.
"Brazil Application Serial No. BR1120130056967, Response filed Feb. 10, 2020 to Office Action dated Nov. 5, 2019", with English claims, 45 pages.
"Brazilian Application Serial No. BR1120130055251, Voluntary Amendment filed Sep. 8, 2014", with English claims, 9 pages.
"Canadian Application Serial No. 2,810,511, Examiner's Rule 30(2) Requisition dated Sep. 30, 2019", 5 pgs.
"Canadian Application Serial No. 2,810,511, Office Action dated Jun. 12, 2018", 4 pgs.

(56) References Cited

OTHER PUBLICATIONS

"Canadian Application Serial No. 2,810,511, Office Action dated Jun. 21, 2017", 4 pgs.
"Canadian Application Serial No. 2,810,511, Office Action dated Dec. 10, 2018", 5 pgs.
"Canadian Application Serial No. 2,810,511, Response filed Apr. 4, 2019 to Office Action dated Dec. 10, 2018", 36 pgs.
"Canadian Application Serial No. 2,810,511, Response filed Aug. 24, 2018 to Office Action dated Jun. 12, 2018", 26 pgs.
"Canadian Application Serial No. 2,810,511, Response filed Dec. 15, 2017 to Office Action dated Jun. 21, 2017", 37 pgs.
"Canadian Application Serial No. 2,810,521, Examiner's Rule 30(2) Requisition dated Jan. 4, 2019", 4 pgs.
"Canadian Application Serial No. 2,810,521, Office Action dated Mar. 1, 2018", 5 pgs.
"Canadian Application Serial No. 2,810,521, Office Action dated Jun. 8, 2017", 3 pgs.
"Canadian Application Serial No. 2,810,521, Response filed Apr. 4, 2019 to Examiner's Rule 30(2) Requisition dated Jan. 4, 2019", 9 pgs.
"Canadian Application Serial No. 2,810,521, Response filed Jul. 30, 2018 to Office Action dated Mar. 1, 2018", 17 pgs.
"Canadian Application Serial No. 2,810,521, Response filed Sep. 7, 2017 to Office Action dated Jun. 8, 2017", 15 pgs.
"European Application Serial No. 01968190.7, European Amendment filed Aug. 18, 2011", 1 pg.
"European Application Serial No. 01968190.7, European Amendment filed Sep. 20, 2011", 3 pgs.
"European Application Serial No. 01968190.7, Office Action dated May 17, 2010", 9 pgs.
"European Application Serial No. 01968190.7, Office Action dated Nov. 6, 2006", 4 pgs.
"European Application Serial No. 01968190.7, Response filed May 16, 2007 to Office Action dated Nov. 6, 2006", 26 pgs.
"European Application Serial No. 01968190.7, Response filed Sep. 24, 2010 to Office Action dated May 17, 2010", 5 pgs.
"European Application Serial No. 11824078.7, Communication Pursuant to Article 94(3) EPC dated May 7, 2018", 3 pgs.
"European Application Serial No. 11824078.7, Communication Pursuant to Article 94(3) EPC dated Aug. 16, 2018", 7 pgs.
"European Application Serial No. 11824078.7, Extended European Search Report dated Aug. 19, 2016", 10 pgs.
"European Application Serial No. 11824078.7, Response filed Feb. 26, 2019 to Communication Pursuant to Article 94(3) EPC dated Aug. 16, 2018", 13 pgs.
"European Application Serial No. 11824078.7, Response filed Mar. 3, 2017 to Extended European Search Report dated Aug. 19, 2016", 4 pgs.
"European Application Serial No. 11824078.7, Response filed May 29, 2018 to Communication Pursuant to Article 94(3) EPC dated May 7, 2018", 1 pg.
"European Application Serial No. 11824078.7, Response filed Nov. 7, 2019 to Summons to Attend Oral Proceedings mailed Jul. 23, 2019", 29 pgs.
"European Application Serial No. 11824078.7, Summons to Attend Oral Proceedings mailed Jul. 23, 2019", 9 pgs.
"European Application Serial No. 11824132.2, Communication pursuant to Article 94(3) EPC dated Mar. 1, 2017", 7 pgs.
"European Application Serial No. 11824132.2, Extended European Search Report dated Feb. 25, 2014", 6 pgs.
"European Application Serial No. 11824132.2, Response filed Mar. 5, 2019 to Summons to Attend Oral Proceedings mailed Nov. 5, 18", 29 pgs.
"European Application Serial No. 11824132.2, Response filed Jun. 27, 2017 to Communication pursuant to Article 94(3) EPC dated Mar. 1, 2017", 4 pgs.
"European Application Serial No. 11824132.2, Response filed Aug. 29, 2014", 12 pgs.
"European Application Serial No. 11824132.2, Summons to Attend Oral Proceedings mailed Nov. 5, 2018", 5 pgs.
"European Application Serial No. 14843569.6, Extended European Search Report dated Mar. 6, 2017", 10 pgs.
"European Application Serial No. 14843569.6, Response filed Sep. 20, 2017 to Extended European Search Report dated Mar. 6, 2017", 12 pgs.
"European Application Serial No. 14843569.6, Response filed Oct. 26, 2016 to Communication pursuant to Rules 161(2) and 162 EPC dated Apr. 22, 2016", 9 pgs.
"European Application Serial No. 14844441.7, Extended European Search Report dated Mar. 2, 2017", 10 pgs.
"European Application Serial No. 14844441.7, Response filed Sep. 20, 2017 to Extended European Search Report dated Mar. 2, 2017", 45 pgs.
"European Application Serial No. 14844441.7, Response filed Oct. 26, 2016 to Communication pursuant to Rules 161(2) and 162 EPC dated Apr. 19, 2016", 7 pgs.
"HTML 4.0 Specification", W3C Recommendation, XP002191626, (Apr. 24, 1998), 12 pgs.
"HTML Support—Multimedia and Images", [Online] Retrieved from the Internet: <URL: http://www.citycat.ru/doc/HTML/IExplorer. 30/mmedia.htm#Marquee>, (1996), 4 pgs.
"International Application Serial No. PCT/US01/26801, International Preliminary Examination Report dated Nov. 25, 2003", 12 pgs.
"International Application Serial No. PCT/US01/26801, International Search Report dated Mar. 14, 2002", 3 pgs.
"International Application Serial No. PCT/US2011/50712, International Preliminary Report on Patentability dated Mar. 21, 2013", 8 pgs.
"International Application Serial No. PCT/US2011/50712, International Search Report dated Jan. 5, 2012", 2 pgs.
"International Application Serial No. PCT/US2011/50712, Written Opinion dated Jan. 5, 2012", 6 pgs.
"International Application Serial No. PCT/US2011/50839, International Preliminary Report on Patentability dated Mar. 21, 2013", 6 pgs.
"International Application Serial No. PCT/US2011/50839, International Search Report dated Dec. 30, 2011", 2 pgs.
"International Application Serial No. PCT/US2011/50839, Written Opinion dated Dec. 30, 2011", 4 pgs.
"International Application Serial No. PCT/US2014/054701, International Preliminary Report on Patentability dated Mar. 24, 2016", 8 pgs.
"International Application Serial No. PCT/US2014/054701, International Search Report dated Jan. 12, 2015", 2 pgs.
"International Application Serial No. PCT/US2014/054701, Written Opinion dated Jan. 12, 2015", 6 pgs.
"International Application Serial No. PCT/US2014/054702, International Preliminary Report on Patentability dated Mar. 24, 2016", 6 pgs.
"International Application Serial No. PCT/US2014/054702, International Search Report dated Nov. 19, 2014", 2 pgs.
"International Application Serial No. PCT/US2014/054702, Written Opinion dated Nov. 19, 2014", 4 pgs.
"Mexican Application Serial No. MX/a/2016/003114, Office Action dated Nov. 16, 2017", with English translation, 4 pages.
"Mexican Application Serial No. MX/a/2016/003114, Response filed Feb. 6, 2018 to Office Action dated Nov. 16, 2017", with English translation, 18 pages.
"Mexican Application Serial No. MX/a/2016/003115, Office Action dated Nov. 7, 2017", with English translation, 6 pages.
"Mexican Application Serial No. MX/a/2016/003115, Response filed Feb. 19, 2018 to Office Action dated Nov. 7, 2017", with English translation, 14 pages.
"MPEG-4 Authoring Tools Let Pros, Consumers Create Mutimedia for Web Pages, TV, HDTV", Sarnoff Document, XP002155140, (Dec. 10, 1998), 2 pgs.
Alvaer, Jose, "Realnetworks' Realaudio and Realvideo", Webdeveloper. com, guide to streaming multimedia, XP002150113, ISBN:0-471-24822-3, (1998), 20 pgs.
Chai, Crx K., "U.S. Appl. No. 12/877,875 / Smart Media Selection Based on Viewer User Preference", 11.

(56) References Cited

OTHER PUBLICATIONS

Chambers, C. S., "Designing a set-top box operating syatem", International conference on consumer electronics,IEEE US vol. Conf. 14, XP000547858 ISBN 0-7803-2141-3, (Jun. 7, 1995), 368-369.

Clearplay, "Being a Very Cool Responsible Parent Just Got a Whole Lot Easier", [Online]. Retrieved from the Internet: <URL: http://www.clearplay.com/>, (Accessed Jan. 13, 2003), 2 pages.

Clearplay, "Enjoy the Show!", Press Release, Dec. 10, 2001, "ClearPlay Launches Groundbreaking Movie Filtering,", [Online]. Retrieved from the Internet: <URL: http://www.clearplay.com/10Dec2001.asp>, (Dec. 10, 2001), 2 pages.

Cobb, Jerry, "Taking Violence out of DVD Movies—System from ClearPlay Removes 'R' Content from DVDs", CNBC, [Online]. Retrieved from the Internet: <URL: http://www.msnbc.com/news/857154.asp?cpl=1,>, (Jan. 9, 2003), 3 pgs.

EBU Project Group B/CA, "Functional model of a conditional access system", EBU Technical Review, 266, Grand-Saconnex, CH, (Winter 1995), 64-77.

Fernandez, Panadero MC, et al., "Mass-customizing electronic journals", Online!, XP002177409, (May 10, 1999), 11 pgs.

Giles, Aaron, "Transparency—A Quick and Dirty Utility for Creating Tranparent GIF Images", [Online]. Retrieved from the Internet: <URL: http://www.mit.edu:8001/people/nocturne/etc/Transparency_notes.html>, (Aug. 19, 1994), 2 pgs.

Levin, "Software Design of a Personal Television Service", ICCE 2000, (2000), pp. 26-27.

Shim, S.Y. Shim, et al., "Template Based Synchronized Multimedia Integration Language Authoring Tool", Proceedings of the SPIE, SPIE, Bellingham, VA, vol. 3964, (Jan. 2000), 134-142.

Vuorimaa, Petri, et al., "XML Based Text TV", IEEE—WISE '00 Proceedings of the First International Conference on Web, (2000), 109-113.

Watson, Christopher, "Scripting the Web (times 2)", [Online]. Retrieved from the Internet: <URL: http://groups.google.com/groups?q=javascript+hypermedia&hl=en&selm=cwatson-3008961022470001%40204.212.150.108&rnum=7>, (Aug. 30, 1996), 2 pages.

"U.S. Appl. No. 16/511,648, Final Office Action dated Nov. 8, 2021", 23 pages.

"U.S. Appl. No. 15/882,472, Non Final Office Action dated Jul. 12, 2019", 16 pgs.

"U.S. Appl. No. 16/148,843, Notice of Allowance dated Jul. 18, 2019", 8 pgs.

"U.S. Appl. No. 16/148,843, Supplemental Amendment filed Oct. 9, 2019", 8 pgs.

"U.S. Appl. No. 16/148,843, Notice of Allowance dated Oct. 18, 2019", 8 pgs.

"U.S. Appl. No. 15/882,472, Examiner Interview Summary dated Nov. 5, 2019", 3 pgs.

"U.S. Appl. No. 15/882,472, Response Filed Jan. 6, 2019 to Non Final Office Action dated Jul. 12, 2019", 10 pgs.

"U.S. Appl. No. 15/882,472, Final Office Action dated Nov. 27, 2019", 16 pgs.

"U.S. Appl. No. 16/511,648, Response filed May 25, 2021 to Final Office Action dated Feb. 25, 2021", 11 pgs.

"U.S. Appl. No. 16/511,648, Non Final Office Action dated Jun. 4, 2021", 26 pgs.

"Brazil Application Serial No. BR1120130055251, Response filed Apr. 27, 2021 to Final Office Action dated Feb. 19, 2021", with English claims, 19 pages.

"U.S. Appl. No. 16/511,648, Response filed Sep. 7, 2021 to Non Final Office Action dated Jun. 4, 2021", 12 pgs.

"U.S. Appl. No. 12/877,993, Examiner's Answer dated Jun. 3, 2016 to Appeal Brief filed Feb. 24, 2016", 10 pgs.

"U.S. Appl. No. 12/877,993, Reply Brief filed Aug. 3, 2016 to Examiner's Answer dated Jun. 3, 2016", 5 pgs.

"U.S. Appl. No. 16/511,648, Appeal Brief filed Apr. 8, 2022", 20 pgs.

"U.S. Appl. No. 16/511,648, Examiner's Answer to Appeal Brief dated Jun. 1, 2022", 23 pgs.

\* cited by examiner

COLLECTING DATA FROM DIFFERENT SOURCES

CROSS REFERENCE TO RELATED APPLICATIONS

This application is a Continuation of U.S. patent application Ser. No. 16/237,022, filed on Dec. 31, 2018, which is a Continuation of U.S. patent application Ser. No. 12/878,001, filed on Sep. 8, 2010, which is a Continuation-in-Part of U.S. patent application Ser. No. 12/877,034, filed on Sep. 7, 2010, which applications are incorporated herein by reference in their entireties.

TECHNICAL FIELD

This application relates to the fields of media and entertainment and specifically to method and system for aggregating data collected from different sources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In the field of media and entertainment, there is a new generation of viewers that has a high expectation of the level of entertainment to be enjoyed from various sources of content, such as, e.g., television programming, the Internet, and locally stored content. These viewers may expect more choice, more flexibility, as well as the ability to interact and participate more with the viewable content.

On the other hand, the sheer volume of content that is available for viewing is exploding dramatically. Just the number of television channels that are now available is almost unmanageable. The amount of content that is available via free video or video on demand service is also increasing. It is now possible to view content over a wider span of time by employing time shifting technologies, such as Personal Video Recording (PVR) (sometimes referred to as DVR or Digital Video Recording). This explosion of content may be described as a paradox of choice, where the excess of choices causes a viewer's inability to choose.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
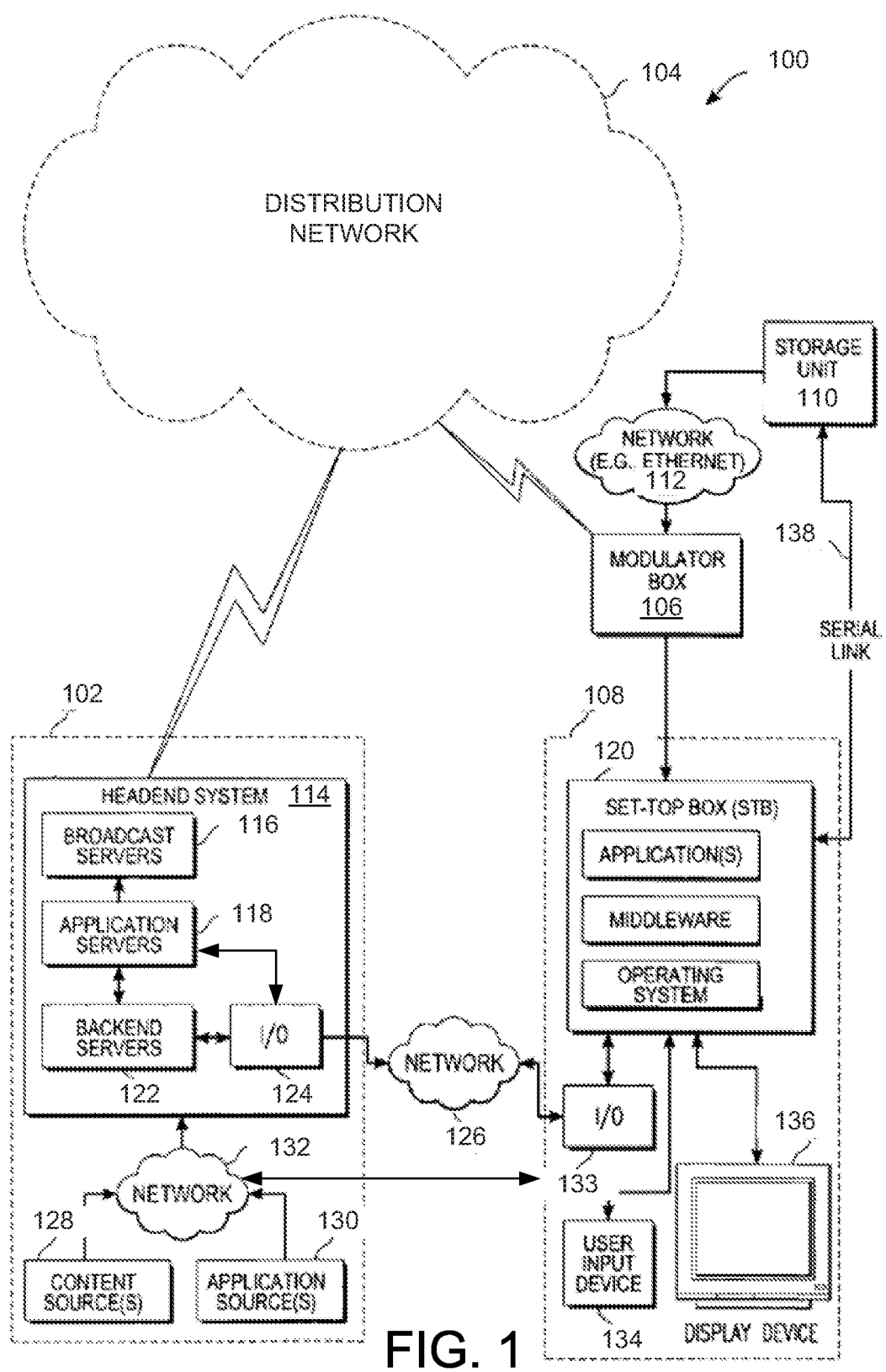
FIG. 1 illustrates an environment within which an example smart playlist may be implemented, in accordance with an example embodiment.

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

A system is described to collect information from a great number of viewers' client devices, determine a list of popular content items based on the collected information, customize the list for a particular viewer, and send that list to the viewer's device. This approach to aiding a viewer in making choices in the universe of viewable content may be termed a smart playlist system. Example embodiments described herein provide systems and methods to generate a smart play list. For the purposes of this description, the term viewer will be understood to include actual viewers, as well as potential viewers, e.g., persons that may at some point in time view a video program.

In one embodiment, a smart playlist system obtains from viewers' client devices content-related information such as, e.g., which programs are being currently viewed, which programs are being recorded and scheduled to be recorded, which content has been rated and the associated ratings, as well as recommendations pertaining to programs, purchases of various programs, etc. For the purposes of this description the terms content, content item, show, and program will be understood to denote viewable content. Data collected indiscriminately from the entire accessible community of viewers may be accumulated in a repository termed a global bucket. Data from the global bucket may be analyzed to determine programs that appear to be most popular at the time of the analyzing, i.e., appear to be of heightened interest to viewers. A certain number of programs that have been determined as most popular are compiled into a so-called hot list. The hot list may be made available to viewer, e.g., by communicating the list to the viewers' client devices or providing an access link that can be invoked from the users' devices.

Before a hot list is provided to a viewer, it may be personalized for the viewer by determining how relevant the items in the hot list are to that particular viewer and presenting to the viewer only those programs that have been determined to be of high relevance to the viewer. The relevancy of a particular program to a particular viewer may be determined by associating each item in the hot list with a score based on the viewer's profile, on the viewer's content viewing history and patterns, as well as based on information collected from the client devices of a subset of viewers who are members of the particular viewer's social network.

In one example embodiment, in addition to determining a personalized hot list of content items, a smart playlist system may trigger recording of a certain program as soon as the program has been identified as a live program and of high relevance to the viewer. For example, a viewer may not be tuned into a channel broadcasting a particular live sports event. If the smart playlist system determined that the live sports event is of high relevance to the viewer, the smart playlist system may trigger the recording of the live broadcast of the sports event on the viewer's client device (e.g., a set top box, a desktop computer, etc.) and also alerts the user to the fact that she may be interested in the event being currently broadcast on a certain channel. The viewer may then ignore the alert. If the viewer, instead, tunes to the suggested channel the viewer would not have missed the beginning of the broadcast because the recording of the program has been automatically triggered by an instruction provided to the viewer's client device from the smart playlist system. In one example, the high relevancy of the live broadcast may have been determined based on the fact that all of the viewer's social network contacts have either tuned into the associated channel or have scheduled the recording of the broadcast. In another example, the high relevancy of the live broadcast may have been determined based on the viewer's profile or on the viewer's viewing history. An example smart playlist system may be implemented within architecture illustrated in FIG. 1.

FIG. 1 illustrates network architecture of an example interactive media environment 100 wherein some embodiments of the present invention may be deployed. The interactive media environment 100 includes a source system 102 that communicates data (e.g., media content data and interactive application data) via a distribution network or system 104 (e.g., the Internet, a mobile communication network, or any other network capable of communicating digital data) and a modulator box 106 to a receiver system 108. In one example embodiment, the interactive media environment 100 optionally includes a storage unit 110 (e.g., personal computer) that communicates stored data via a network 112 to the modulator box 106 which, in turn, communicates the stored data, media content data, and interactive application data to the receiver system 108. The modulator box 106, storage unit 110, and the receiver system 108 may be co-located in a user's home. Thus, in one embodiment, the modulator box 106 may combine media content data and interactive application data received from the remote source system 102 with a local stored data provided by the storage unit 110 provided at the user's home.

Turning first to the source system 102, an example headend system 114 operates to communicate the data as a broadcast transmission. To this end, the headend system 114 is shown to include one or more broadcast servers 116 and, optionally, one or more application servers 118. Each of the broadcast servers 116 may operate to receive, encode, packetize, multiplex, modulate, and broadcast data from various sources and of various types. While the example embodiment is described herein as transmitting data from the headend system 114 as a broadcast, it will be appreciated that the relevant data could also be unicast or multicast from the source system 102 via the distribution system 104 and modulator box 106 to the receiver system 108. In various embodiments, data could also be transmitted from the source system 102 via a network connection to the receiver system 108. Further, in other example embodiments the source system 102 may be modified to facilitate communications via the Internet, a mobile phone network, or any other network capable of communicating digital data.

Each application server 118, in one example embodiment, compiles and provides interactive data modules to the broadcast server 116. The interactive data modules may also include data that is utilized by an interactive television application. The application server 118 may also include multiplexing functionality to enable multiplexing of, for example, interactive television applications and associated data with audio and video signals received from various sources. The application server 118 may also have the capability to feed (e.g., stream) multiple interactive television applications to one or more broadcast servers 116 for distribution to the receiver system 108. To this end, each application server 118 may implement a so-called "carousel," whereby code and data modules are provided to a broadcast server 116 in a cyclic, repetitive manner for inclusion within a transmission from the headend system 114. In other embodiments, code may reside permanently in a set-top box (STB) 120 (e.g., the code may be stored in non-volatile memory of the STB 120), may be pushed of downloaded to the STB 120, or be provided to the STB 120 in any other manner. In one embodiment, the application server 118 provides a smart playlist mechanism to collect information from viewers, determine a list of popular content items, customizing the list for a particular user and sending that lit to the user's device. The smart playlist mechanism will be discussed by way of example in more detail in connection with FIGS. 2-4.

The headend system 114 is also shown, by way of example, to include one or more backend servers 122, which are coupled to the application servers 118 and to an input/output device 124 (e.g., a modem pool). Specifically, the I/O device 124 is coupled to receive data from the receiver system 108 via a network 126 (e.g., the Internet) and to provide this data to backend servers 122. The backend servers 122 may then provide the data, received from the receiver system 108, to the application servers 118 and the broadcast servers 116. Alternatively, data received from the receiver system 108 may be directly provided to the application servers 118.

Accordingly, the network 126 and the I/O device 126 may operate as a return channel whereby the receiver system 108 is provided with interactivity with the source system 102. Data provided to the headend system 114 via the return channel may include, merely for example, user input to an interactive media application executed at the receiver system 108 or data that is generated by the receiver system 108 and communicated to the source system 102. The return channel may also provide a channel whereby programs, targeted advertisements/commercials, and applications from the source system 102 are provided to the receiver system 108.

Within the source system 102, the headend system 114 is also shown optionally to receive data (e.g., content, code, and application data) from external sources. For example, the headend system 114 may be coupled to one or more content sources 128 and one or more application sources 130 via a network 132 (e.g., the Internet). For example, a content source 128 may be a provider of entertainment content (e.g., movie), a provider of real-time dynamic data (e.g., weather information), and the like. The application source 130 may be a provider of any interactive media application. For example, one or more application sources 130 may provide a TV media player application, electronic program guide and navigation applications, messaging and communication applications, information applications, and so forth. The application sources 130 may be configured to execute on different client devices (e.g., mobile phones, personal computer, STBs, or the like).

Turning now to the example distribution system 104, the distribution system 104 may, in one embodiment, support the broadcast distribution of data from the source system 102 to the receiver system 108. As shown, the distribution network or system 104 may comprise a satellite, cable, terrestrial or Digital Subscribers Line (DSL) network, or any other data communication network or combination of such networks.

The receiver system 108 is shown, in one example embodiment, to include the set-top box (STB) 120 that receives data (e.g., primary and secondary content streams) via the distribution system 104 and modulator box 106 and an input/output device 132 (e.g., modem) for return channel communications with the headend system 114. The receiver system 108 is also shown to include other optional external systems such as a user input device 134 (e.g., a keyboard, remote control, mouse etc.) and a display device 136, coupled to the set-top box 120, for the display of content received at the set-top box 120. In one example embodiment, the display device 136 may be a television set.

The modulator box 106, in one example embodiment, receives stored data from the storage unit 110 and a broadcast transmission from the source system 102. The modulator box 106 multiplexes the stored data into the broadcast transmission thereby generating a second transmission that is communicated to the receiving system 108. It will, however, be appreciated that storage unit functionality is optional. The storage unit 110 may store data and, upon request, communicate the stored data to the modulator box 106 over the network 112 (e.g., Ethernet). The storage unit 110 may communicate the stored data in response to commands that are entered by a user from the set-top box 120 and communicated to the storage unit 110 over a link 138.

It will be appreciated to one skilled in the art that one or more of the modules, applications, or the like of the modulator box 106, the set-top box 120, and the storage unit 110 may be combined or integrated. In general, components, protocols, structures, and techniques not directly related to functions of example embodiments have not been shown or discussed in detail. The description given herein simply provides a variety of example embodiments to aid the reader in an understanding of the systems and methods used herein. While the interactive media environment 100 is illustrated having a receiving system 108 including a set-top box 120, it is noted that the receiving system 108 may comprise a mobile device or a personal computer coupled to a network for receiving media.

Smart playlist may be utilized beneficially in the context of a network environment. FIG. 1 illustrates an environment 100 within which an example smart playlist may be implemented. The environment 100 includes a set top box 110 in communication with an entertainment display device 120 and a control device 130. The set-top box (STB) 110 may be a device that connects to a television and an external source of signal, turning the signal into content which can then be displayed on the television screen. In one example embodiment, the entertainment display device 120 is a television set, and the control device 130 is a remote control device that may be used for switching between television channels, for example. The set-top box 110 may be configured to include a system 112 to provide a smart playlist that may include features outlined above. The set-top box 110 may be configured to receive content from sources such as, e.g., an Ethernet cable, a satellite dish, a coaxial cable, a telephone line (including digital subscriber line (DSL) connections), Broadband over Power Line, as well as very high frequency (VHF) or ultra high frequency (UHF) antenna. Content, in this context, could mean any or all of video, audio, Internet web pages, interactive games, or other possibilities. As shown in FIG. 1, the set-top box 110 is shown as having access to signal sources 140, including broadcast programming 142, video on demand programs 144, as well as to local content 146 and Internet content 148.

Figure 2:
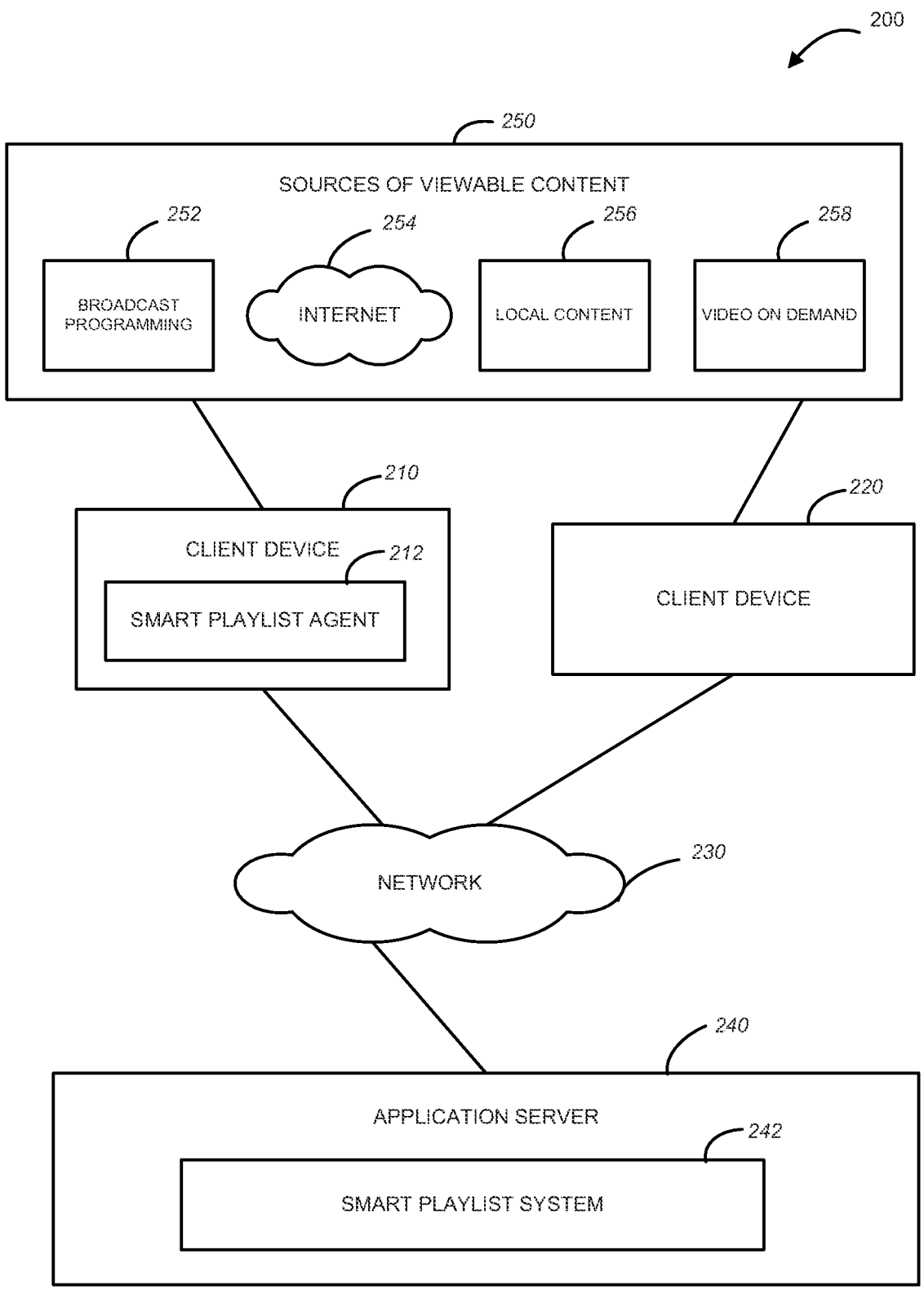
FIG. 2 is a network diagram illustrating architecture within which a smart playlist may be utilized, in accordance with an example embodiment.

FIG. 2 is a network diagram illustrating architecture 200 within which a smart playlist may be utilized, in accordance with an example embodiment. The architecture 100 includes a client device 210 and a client device 220, each configured to receive content from content sources 250 and to be in communication with a server system 240 via a communications network 230. The client devices 210 and 220 may be set top boxes, desktop computers, mobile devices, etc. The communications network 230 may be a public network (e.g., the Internet, a wireless network, etc.) or a private network (e.g., a local area network (LAN), a wide area network (WAN), Intranet, etc.). The server 240 may include a smart playlist system 242 configured to collect information related to utilization of viewable content from viewers' client devices, to aggregate and customize the collected information, and to provide the resulting hot list to viewers personalized for each particular user, as was described above.

The client device 210 may be configured to include a smart playlist agent 212 that may be configured to cooperate with the smart playlist system 242 with respect to collecting information regarding viewable content accessed or referenced on the client device 210. In some embodiments, the smart playlist system 242 may be configured to obtain information regarding viewable content accessed or referenced on a client device without the use of a smart playlist agent. As shown in FIG. 2, the client devices 210 and 220 have access to signal sources 250. The signal sources 250 include broadcast programming 252, video on demand programs 254, as well as to local content 256 and Internet content 258.

In one embodiment, the smart playlist system 242 may be configured to collect content-related data from different sources in addition to client devices. For example, he smart playlist system 242 may be configured to collect content-related data from systems providing on-line social communities, systems providing search engines, systems of providers of video-on-demand, system of providers of content for purchase or rent, etc. The collected data may be weighted according to its source (e.g., in analyzing the collected data to generate a smart playlist data collected from a certain on-line blog server may be weighted lower than data collected from a video-on-demand provider system). An example architecture, within which data collected from different sources may be processed utilizing smart playlist system (also referred to as a recommendation engine) may be described with reference to FIG. 3.

Figure 3:
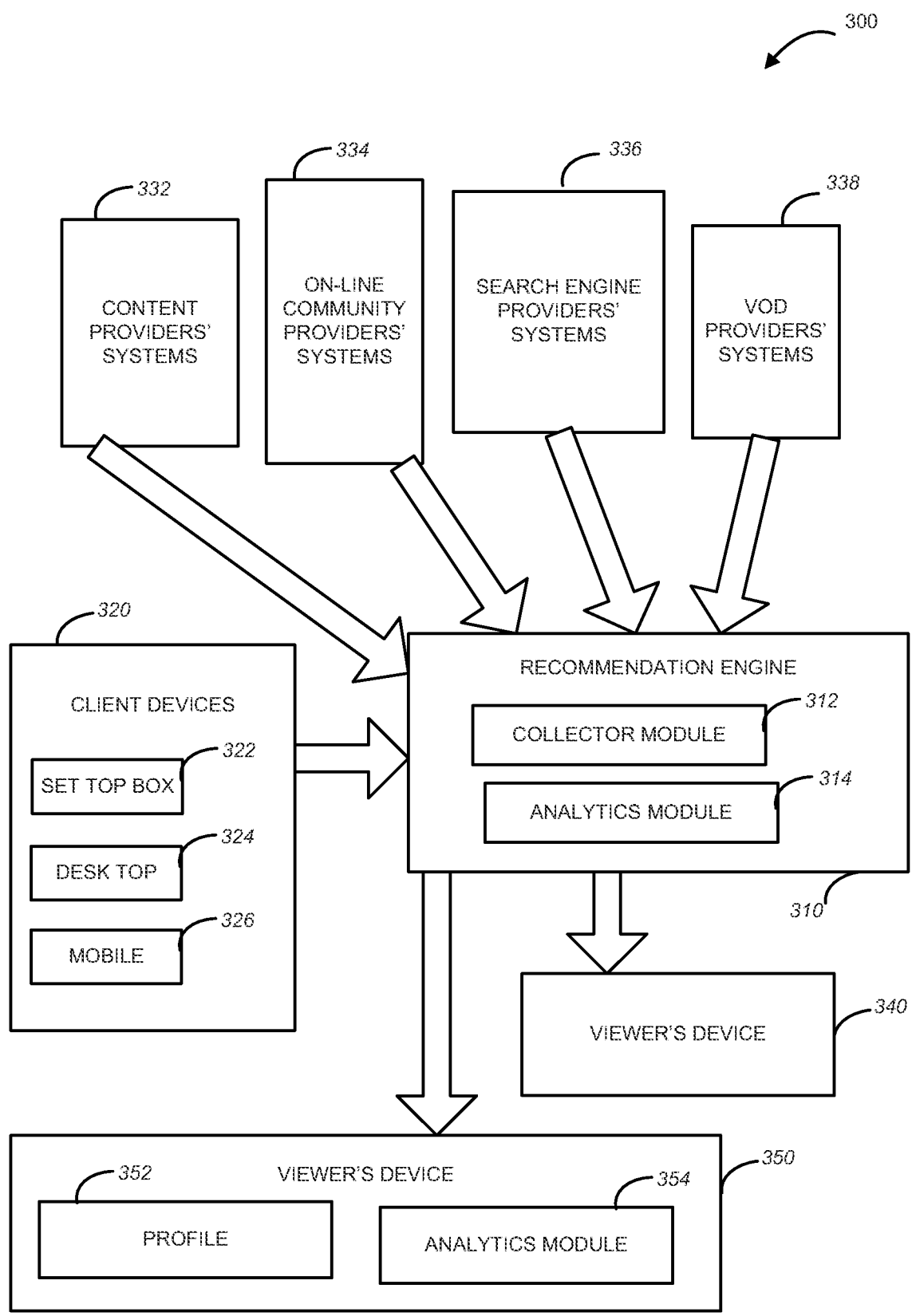
FIG. 3 is an example architecture within which data collected from different sources may be processed utilizing a recommendation engine, in accordance with an example embodiment.

FIG. 3 illustrates architecture 300 comprising a recommendation engine 310 that, in one embodiment, may reside on the application server 240 of FIG. 2 and may correspond to the smart playlist system 242 or it may be hosted on some other computer system or be distributed across multiple computers or computer systems. The recommendation engine 310 may be configured to use a collector module 312 to obtain content-related information from different sources such as, e.g., content providers' systems 332, on-line community providers' systems 334, search engine providers' systems 336 web searching services, video-on demand providers' systems 338, a system providing an electronic programming guide, etc. The term "system" will be understood to include one or more computer modules provided on a computer or distributed across multiple computers or computer systems. The content providers' systems 332 may include one or more server computers hosting a video-sharing website. The on-line community providers' systems 334 may include one or more server computers hosting a social networking website or a microblogging service. The video-on demand providers' systems 338 may include one or more server computers hosting a rental-by-mail and video streaming services. The collector module 312 provided with the recommendation engine 310 may be also configured to obtain content-related information from client devices 320, such as a set top box 322, a desk top computer 324, a mobile device 326, etc.

Content-related data, which may include viewership information, changes in viewership (e.g., a sudden spike in the number of users trending about a video program or a dramatic increase in the number of viewers watching or recording a video program), ratings of content, references to content items in on-line publications, rental and purchasing information, etc., may be processed by the analytics module 314 to identify those content items that appear to be of heightened interest to viewers. An indication of the heightened interest (also referred to as popularity) may be expressed in terms of a popularity value, which may be calculated for a content item (e.g., a video program) based on, cumulatively, the total number of viewers currently watching or recording the video program being above a predetermined threshold value, the total number of viewers currently watching or recording the video program having increased by a certain percent as compared to the earlier measurement, the number of times the video program has been referenced in microblogs or on-line social network news feeds, etc. The recommendation engine 310 may be configured to generate a list of popular content items, where a popular item is associated with a popularity value above a certain threshold value, customize the lists respectively for viewers associated with viewer devices 340 and 350, and provide the customized lists to the viewer devices 340 and 350. Customization process is described in further detail with reference to FIG. 4 below.

Prior to customizing the list of popular content items for a specific viewer, the recommendation engine 310 may apply to the list a preliminary filter configured to filter the list based on characteristics of various groups of users. Such preliminary filtering may be based on geographic location or demographics of a group of users. In one embodiment, the viewer's device 350 may host an analytics module 354 that may be configured to receive content-related data from the recommendation engine 310 and used the received data to generate recommendations, e.g., using profile data stored in a profile repository 352. An example system to generate a smart playlist (e.g., a customized list of popular items) may be described with reference to FIG. 4.

Figure 4:
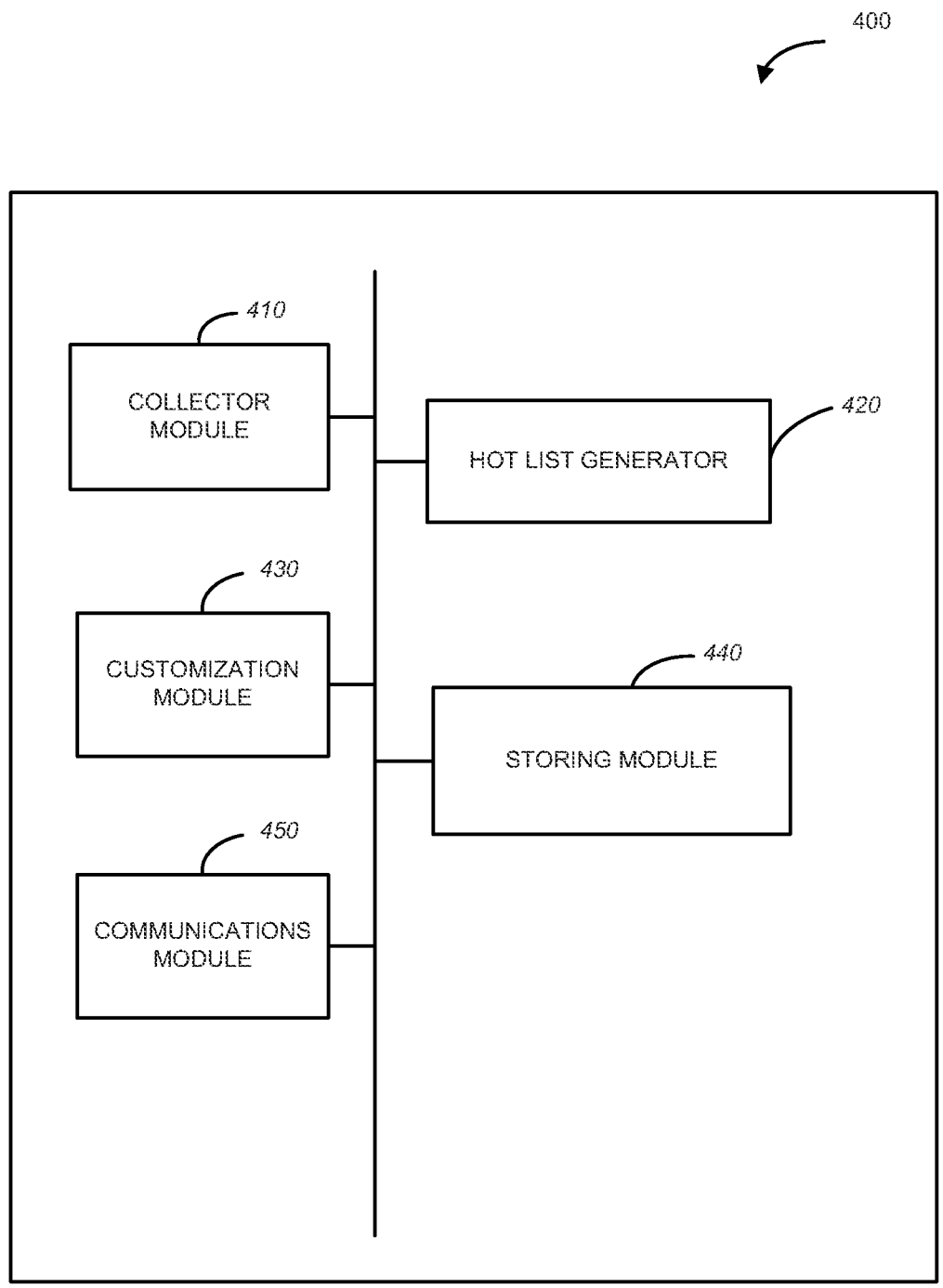
FIG. 4 is a block diagram illustrating a smart playlist system, in accordance with an example embodiment.

FIG. 4 illustrates an example system 400 to generate a smart playlist based on content utilization information collected from client devices of the entire community of users that can be accessed by the smart playlist system. The system 400, which may correspond to the recommendation engine 410 of FIG. 4 or a smart playlist system 240 of FIG. 2, includes a collector module 410, a hot list generator 420, a customization module 440, and a communications module 450. The collector module 410 may be configured to obtain content utilization data from a plurality of client devices (e.g., the client devices 210 and 220 of FIG. 2. The content utilization data for a viewer from the plurality of viewers may be indicative of the viewer's interest in respective content items. In one embodiment, the collector module 410 obtains content utilization data from a real time listener provided at a client device, e.g., the smart playlist agent 212 of FIG. 2. The hot list generator 420 may be configured to generate a list of popular content items based on the obtained content utilization data.

The collector module 410 obtains content utilization information from all client devices accessible to the smart playlist system 400. This information, collected from the entire universe of viewers that have diverse tastes, viewing habits, and content source preferences and that reflects content utilization of the entire viewing community, is stored, by a storing module 440, in a repository termed a global bucket. The data from the global bucket is analyzed by the hot list generator 420 to determine those content items that are of most interest to the global community of viewers and assemble those content items into a list of popular items, a so-called hot list. In one embodiment, the hot list generator 420 may generate a hot list based on how many viewers are watching or recording a show, the duration of the watching, ratings and recommendations associated with the program, and so on. As the collector module 410 continuously obtains content utilization data from client devices, the hot list generator 420 may be configured to continuously update the hot list, e.g., once a day or based on any predetermined time period.

The customization module 440 may be configured to customize the hot list that is generated based on the information from the global bucket that reflect preferences of the entire community of viewers to target more closely the actual and projected preferences of a particular viewer (a target viewer) and generate a so-called customized playlist. The customizing may be based on the viewer's profile that may be stored at the application server 240 of FIG. 2, as well as on the viewing history of the viewer and the viewing history of members of the viewer's social network. In one embodiment, the storing module 440 stores content utilization data for individual viewers in respective repositories termed personal buckets. A viewer's profile stored at the application server 240 may indicate that one or more other viewers are associated with the viewers as "friends" in terms of social networking. The storing module 440 stores content utilization data collected from client devices of the viewer's "friends" or social connections in a repository termed a social bucket. The customization module 440 may utilize data from the viewer's personal bucket and the viewer's social bucket to generate the customized playlist. The customization module 440 may be configured to periodically update the customized playlist, e.g., based on the changes in the hot list, based on the changes in the data stored in the personal bucket and the social bucket, as well as based on the changes in the viewer's profile.

In one embodiment, a customized playlist is generated by generating a score for each item from the list of popular content items and including items into in the customized playlist based on respective scores of the items from the list of popular content items. The scoring may be based on the viewer's preferences identified in the viewer's profile, based on data from the viewer's personal bucket and the viewer's social bucket. A content item from a category that is not indicated in the viewer's profile as being of interest to the viewer and that is not considered as being of interest to the viewer based on the viewing history of the viewer may still be assigned a high score by the customization module 440 based on the information from the viewers social bucket. For example, the customization module 440 may be configured to weigh heavily an indication that a certain content item is of high interest to a great number of the viewer's social contacts.

The communications module 450 may be configured to communicate the customized playlist to a client device of the target viewer. The communications module 450 may be configured to communicate to the client device an instruction to start recording of a live program identified in the customized playlist. The communications module 450 may also be configured to communicate to the client device an instruction to display an alert message regarding of a live program identified in the customized playlist. As mentioned above, a client device may be a set top box, a desktop computer, or a mobile device. Content items referenced in the hot list or in the customized playlist may be associated with a variety of content sources, such as, e.g., the Internet, video on demand, and live broadcast. Example operations performed by the system 400 may be described with reference to FIG. 5.

Figure 5:
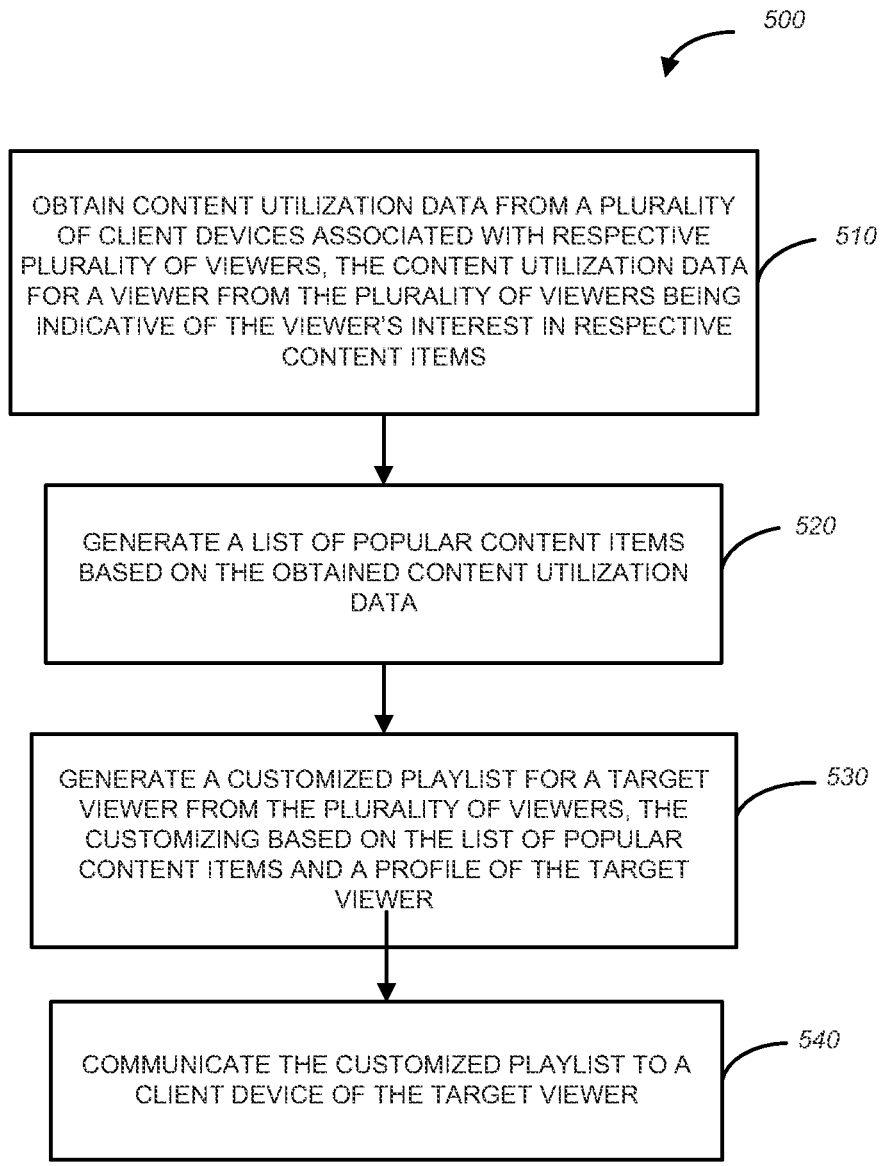
FIG. 5 is a flow chart illustrating a method for providing a smart playlist to a viewer's client device, in accordance with an example embodiment.

FIG. 5 illustrates an example method 500 of providing a smart playlist. The method 500 may be performed in the context of media and entertainment, e.g., in the context of television entertainment. The method 500 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 3 or FIG. 4.

As shown in FIG. 5, the method 500 commences with operation 510, where the collector module 410 of FIG. 4 obtains content utilization data from a plurality of client devices associated with respective plurality of viewers. At operation 520, the hot list generator 420 of FIG. 4 generates a list of popular content items based on the obtained content utilization data. At operation 540, the customization module 440 of FIG. 4 generates a customized playlist for a target viewer from the plurality of viewers, based on the list of popular content items and a profile of the target viewer. At operation 540, the communications module 440 of FIG. 4 communicates the customized playlist to a client device of the target viewer.

Figure 6:
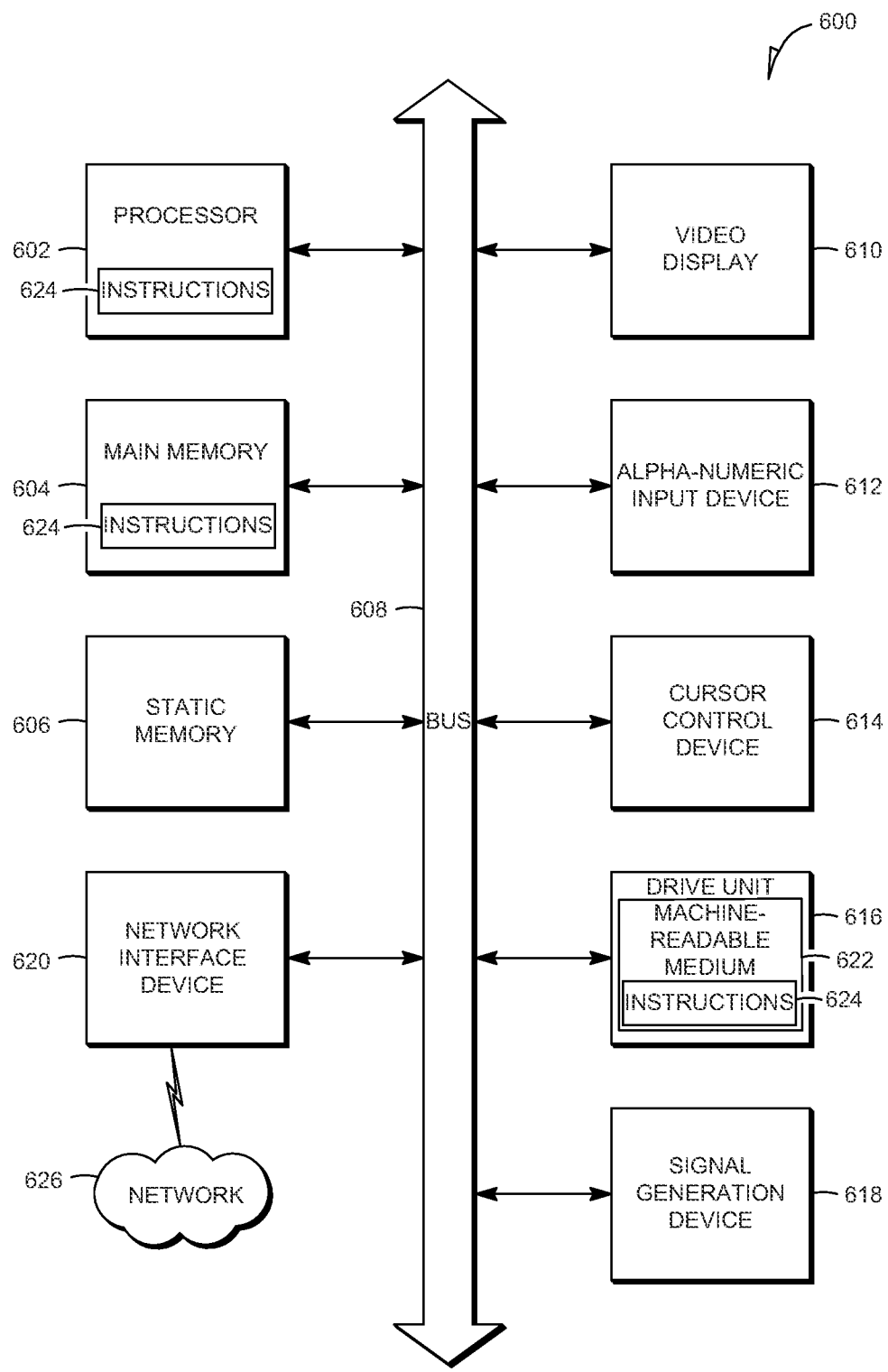
FIG. 6 illustrates a diagrammatic representation of a machine in the example form of a computer system within which a set of instructions, for causing the machine to perform any one or more of the methodologies discussed herein, may be executed.

FIG. 6 shows a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a real or virtual keyboard), a viewer interface (UI) navigation device 614 (e.g., a remote control or a mouse), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604, within the processor 602 during execution thereof by the computer system 600, the main memory 604 and the processor 602 also constituting machine-readable media. The main memory 604 comprises storage locations that are addressable by the processor 602 for storing software program code. The memory may comprise a form of random access memory (RAM). Those skilled in the art will appreciate that other memory means, such as FLASH memory media, may also be used for storing the program instructions and data structures shown in the main memory 604.

The software 624 may further be transmitted or received over a network 626 via the network interface device 620 utilizing any one of a number of well-known transfer protocols (e.g., HTTP).

While the machine-readable medium 622 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" shall also be taken to include any medium (e.g., FLASH memory media) that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

The embodiments described herein may be implemented in an operating environment comprising software installed on a computer, in hardware, or in a combination of software and hardware.

Thus, method and system to collect content-related data from multiple source computer systems have been described. In the description above, for purposes of explanation, numerous specific details have been set forth in order to provide a thorough understanding of one example embodiment. It will be evident, however, to one skilled in the art that the present invention may be practiced without these specific details. It is to be noted that the delivery mechanism for the content for viewing may be via a satellite, cable, terrestrial broadcast, Internet, local storage, a local network, mobile telephony, or any other content distribution network. Accordingly, the viewing device need not be a television set but may be any display unit of any device (including portable devices). It will be noted that any references to television content will be understood to include any content available for viewing on an entertainment display device, such as a television screen. Such content may include television programming, as well as locally stored content, such as stored video files or digital images, as well as content accessible via the Internet. It will be noted that the term viewer may be understood broadly as any user that may potentially view viewable content at any point in time.

The invention claimed is:

1. A computer-implemented method comprising:
receiving, at a server computer system, first content-related data indicative of a first number of viewers currently watching or recording a content item;
receiving, at the server computer system, second content-related data indicative of a second number of viewers currently watching or recording the content item;
calculating, by the server computer system, a value for the content item, the calculating of the value for the content item comprising:
accessing a change in viewership of the content item based on the first number of viewers, a first weight value applied to the first number of viewers, the second number of viewers, a second weight value applied to the second number of viewers, and a reference viewership information of the content item; and
comparing the change in viewership of the content item to a first predetermined threshold; and
automatically generating, by the server computer system, based on the calculated value for the content item satisfying a second predetermined threshold, third content-related data comprising information identifying the content item.

2. The method of claim 1, wherein the first content-related data comprises information related to a specific viewer.

3. The method of claim 1, wherein the second content-related data comprises information related to a plurality of viewers.

4. The method of claim 2, wherein the information related to the specific viewer is chosen from the group consisting of: device type, network type, user demographics, user history, user profile, or user preference.

5. The method of claim 3, wherein the information related to the plurality of viewers is chosen from the group consisting of: device type, network type, users demographics, users history, users profile, or users preferences.

6. The method of claim 1, further comprising:
generating, by the server computer system, playlist data for a viewer, the playlist data identifying the content item based on a content preference identified in a profile of the viewer; and
based on generating the playlist data, automatically sending, by the server computer system, to a device of the viewer, an instruction that causes the device to perform an operation for the content item identified in the playlist data.

7. The method of claim 6, wherein the content preference comprises a preference of the viewer for a particular content category.

8. The method of claim 6, wherein the instruction that causes the device to perform the operation for the content item causes the device to generate an alert for the content item.

9. The method of claim 1, wherein the content item is a broadcast program.

10. The method of claim 1, wherein the content item is a video on demand program.

11. The method of claim 1, wherein the content item comprises Internet content.

12. The method of claim 1, wherein the receiving of the first content-related data comprises receiving the first content-related data from a set top box.

13. The method of claim 1, wherein the receiving of the first content-related data comprises receiving the first content-related data from a desktop computer.

14. The method of claim 1, wherein the receiving of the first content-related data comprises receiving the first content-related data from a mobile device.

15. A system comprising:
a memory that stores instructions; and
one or more processors configured by the instructions to perform operations comprising:
receiving first content-related data indicative of a first number of viewers currently watching or recording a content item;
receiving second content-related data indicative of a second number of viewers currently watching or recording the content item;
calculating a value for the content item, the calculating of the value for the content item comprising:
accessing a change in viewership of the content item based on the first number of viewers, a first weight value applied to the first number of viewers, the second number of viewers, a second weight value applied to the second number of viewers, and a reference viewership information of the content item; and
comparing the change in viewership of the content item to a first predetermined threshold; and
automatically generating, based on the calculated value for the content item satisfying a second predetermined threshold, third content-related data comprising information identifying the content item.

16. The system of claim 15, wherein the first content-related data comprises data describing a number of references to the content item in online media sources.

17. The system of claim 15, wherein the first content-related data comprises information related to a specific viewer.

18. A non-transitory computer-readable storage medium storing instructions that, when executed by one or more processors, cause the one or more processors to perform operations comprising:
receiving first content-related data indicative of a first number of viewers currently watching or recording a content item;
receiving second content-related data indicative of a second number of viewers currently watching or recording the content item;
calculating a value for the content item, the calculating of the value for the content item comprising:
accessing a change in viewership of the content item based on the first number of viewers, a first weight value applied to the first number of viewers, the second number of viewers, a second weight value applied to the second number of viewers, and a reference viewership information of the content item; and
comparing the change in viewership of the content item to a first predetermined threshold; and
automatically generating, based on the calculated value for the content item satisfying a second predetermined threshold, third content-related data comprising information identifying the content item.

19. The computer-readable storage medium of claim 18, wherein the first content-related data comprises data describing ratings of the content item.

20. The computer-readable storage medium of claim 18, wherein the operations further comprise:

generating playlist data for a viewer, the playlist data identifying the content item based on a content preference identified in a profile of the viewer; and based on generating the playlist data, automatically sending, to a device of the viewer, an instruction that causes the device to perform an operation for the content item identified in the playlist data.

* * * * *